(12) United States Patent
Kumar et al.

(10) Patent No.: US 11,850,942 B2
(45) Date of Patent: Dec. 26, 2023

(54) COLD-FORMED GLASS ARTICLE AND ASSEMBLY PROCESS THEREOF

(71) Applicant: CORNING INCORPORATED, Corning, NY (US)

(72) Inventors: Atul Kumar, Horseheads, NY (US); Cheng-Chung Li, Snohomish, WA (US); William Michael Seiderman, Corning, NY (US); Yawei Sun, Elmira, NY (US)

(73) Assignee: Corning Incorporated, Corning, NY (US)

( * ) Notice: Subject to any disclaimer, the term of this patent is extended or adjusted under 35 U.S.C. 154(b) by 24 days.

(21) Appl. No.: 17/681,010

(22) Filed: Feb. 25, 2022

(65) Prior Publication Data
US 2022/0176822 A1  Jun. 9, 2022

Related U.S. Application Data

(63) Continuation of application No. 17/010,509, filed on Sep. 2, 2020, now Pat. No. 11,292,343, which is a (Continued)

(51) Int. Cl.
*B60K 37/02* (2006.01)
*C03B 23/023* (2006.01)
(Continued)

(52) U.S. Cl.
CPC .............. *B60K 37/02* (2013.01); *B32B 3/085* (2013.01); *B32B 3/28* (2013.01); *B32B 7/05* (2019.01);
(Continued)

(58) Field of Classification Search
CPC .. B60K 37/02; B60K 37/04; B60K 2370/152; E06B 3/54; C03B 23/023; C03B 23/037; C03B 23/049; C03B 23/06; C03B 23/065
(Continued)

(56) References Cited

U.S. PATENT DOCUMENTS

| 2,068,030 A | 1/1937 | Lieser |
| 2,608,030 A | 8/1952 | Jendrisak |

(Continued)

FOREIGN PATENT DOCUMENTS

| CN | 1111906 A | 11/1995 |
| CN | 1587132 A | 3/2005 |

(Continued)

OTHER PUBLICATIONS

Indian Patent Application No. 201917031293 Office Action dated May 24, 2021; 6 pages; Indian Patent Office.
(Continued)

*Primary Examiner* — Dennis H Pedder

(57) ABSTRACT

Embodiments of an article comprising a cold-formed glass substrate in a curved shape, a plurality of separate mechanical retainers, and a frame are disclosed. The cold-formed glass substrate has a first major surface, and a second major surface opposing the first major surface. In one more embodiments, the plurality of separate mechanical retainers are attached to the second major surface of the cold-formed glass substrate. The mechanical retainers may be attached to the frame to define a position for each of the plurality of mechanical retainers, such that the mechanical retainers define the curved shape. Embodiments of processes to form such articles are also provided. Such processes can include attaching a plurality of separate mechanical retainers to a flexible glass substrate such that the glass substrate maintains its flexibility, and attaching the mechanical retainers to a frame, such that the mechanical retainers attached to the frame define a cold-formed curved shape for the flexible glass substrate.

19 Claims, 10 Drawing Sheets

Related U.S. Application Data continuation of application No. 16/315,457, filed as application No. PCT/US2017/040661 on Jul. 5, 2017, now Pat. No. 11,607,958.

(60) Provisional application No. 62/358,278, filed on Jul. 5, 2016, provisional application No. 62/458,692, filed on Feb. 14, 2017.

(51) Int. Cl.
| | |
|---|---|
| *C03C 17/00* | (2006.01) |
| *E06B 3/54* | (2006.01) |
| *B60K 3/04* | (2006.01) |
| *B32B 3/28* | (2006.01) |
| *B32B 7/05* | (2019.01) |
| *B32B 7/08* | (2019.01) |
| *B32B 3/08* | (2006.01) |
| *B32B 17/06* | (2006.01) |

(52) U.S. Cl.
CPC .............. *B32B 7/08* (2013.01); *B32B 17/06* (2013.01); *B60K 3/04* (2013.01); *C03B 23/0235* (2013.01); *C03C 17/001* (2013.01); *E06B 3/549* (2013.01); *E06B 3/5445* (2013.01); *B32B 2457/20* (2013.01); *B60K 2370/693* (2019.05)

(58) Field of Classification Search
USPC ...................................... 296/70, 24.34, 37.8
See application file for complete search history.

(56) References Cited

U.S. PATENT DOCUMENTS

| | | | |
|---|---|---|---|
| 3,197,903 | A | 8/1965 | Walley |
| 3,338,696 | A | 8/1967 | Dockerty |
| 3,582,456 | A | 6/1971 | Stolki |
| 3,682,609 | A | 8/1972 | Dockerty |
| 3,753,840 | A | 8/1973 | Plumat |
| 3,778,335 | A | 12/1973 | Boyd |
| 3,790,430 | A | 2/1974 | Mochel |
| 3,799,817 | A | 3/1974 | Laethem |
| 4,147,527 | A | 4/1979 | Bystrov et al. |
| 4,238,265 | A | 12/1980 | Deminet |
| 4,400,419 | A | 8/1983 | Laczynski |
| 4,445,953 | A | 5/1984 | Hawk |
| 4,455,338 | A | 6/1984 | Henne |
| 4,606,159 | A | 8/1986 | Kunert |
| 4,723,386 | A * | 2/1988 | Sandow .................. E06B 3/66 52/200 |
| 4,802,903 | A | 2/1989 | Kuster et al. |
| 4,859,636 | A | 8/1989 | Aratani et al. |
| 4,899,507 | A | 2/1990 | Mairlot |
| 4,969,966 | A | 11/1990 | Norman |
| 4,985,099 | A | 1/1991 | Mertens et al. |
| 5,108,480 | A | 4/1992 | Sugiyama |
| 5,154,117 | A | 10/1992 | Didelot et al. |
| 5,173,102 | A | 12/1992 | Weber et al. |
| 5,245,468 | A | 9/1993 | Demiryont et al. |
| 5,250,146 | A | 10/1993 | Horvath |
| 5,264,058 | A | 11/1993 | Hoagland et al. |
| 5,300,184 | A | 4/1994 | Masunaga |
| 5,711,119 | A | 1/1998 | Cornils et al. |
| 5,897,937 | A | 4/1999 | Cornils et al. |
| 6,044,662 | A | 4/2000 | Morin |
| 6,086,983 | A | 7/2000 | Yoshizawa |
| 6,101,748 | A | 8/2000 | Cass et al. |
| 6,242,931 | B1 | 6/2001 | Hembree et al. |
| 6,265,054 | B1 | 7/2001 | Bravet et al. |
| 6,270,605 | B1 | 8/2001 | Doerfler |
| 6,274,219 | B1 | 8/2001 | Schuster et al. |
| 6,287,674 | B1 | 9/2001 | Verlinden et al. |
| 6,302,985 | B1 | 10/2001 | Takahashi et al. |
| 6,332,690 | B1 | 12/2001 | Murofushi |
| 6,387,515 | B1 | 5/2002 | Joret et al. |
| 6,420,800 | B1 | 7/2002 | Levesque et al. |
| 6,426,138 | B1 | 7/2002 | Narushima et al. |
| 6,582,799 | B1 | 6/2003 | Brown et al. |
| 6,620,365 | B1 | 9/2003 | Odoi et al. |
| 6,816,225 | B2 | 11/2004 | Colgan et al. |
| 6,903,871 | B2 | 6/2005 | Page |
| 7,297,040 | B2 | 11/2007 | Chang et al. |
| 7,375,782 | B2 | 5/2008 | Yamazaki et al. |
| 7,478,930 | B2 | 1/2009 | Choi |
| 7,489,303 | B1 | 2/2009 | Pryor |
| 7,542,302 | B1 | 6/2009 | Curnalia et al. |
| 7,750,821 | B1 | 7/2010 | Taborisskiy et al. |
| 7,955,470 | B2 | 6/2011 | Kapp et al. |
| 8,298,431 | B2 | 10/2012 | Chwu et al. |
| 8,344,369 | B2 | 1/2013 | Yamazaki et al. |
| 8,521,955 | B2 | 8/2013 | Arulambalam et al. |
| 8,549,885 | B2 | 10/2013 | Dannoux et al. |
| 8,586,492 | B2 | 11/2013 | Barefoot et al. |
| 8,652,978 | B2 | 2/2014 | Dejneka et al. |
| 8,692,787 | B2 | 4/2014 | Imazeki |
| 8,702,253 | B2 | 4/2014 | Lu et al. |
| 8,765,262 | B2 | 7/2014 | Gross |
| 8,814,372 | B2 | 8/2014 | Vandal et al. |
| 8,833,106 | B2 | 9/2014 | Dannoux et al. |
| 8,912,447 | B2 | 12/2014 | Leong et al. |
| 8,923,693 | B2 | 12/2014 | Yeates |
| 8,962,084 | B2 | 2/2015 | Brackley et al. |
| 8,967,834 | B2 | 3/2015 | Timmerman et al. |
| 8,969,226 | B2 | 3/2015 | Dejneka et al. |
| 8,978,418 | B2 | 3/2015 | Balduin et al. |
| 9,007,226 | B2 | 4/2015 | Chang |
| 9,061,934 | B2 | 6/2015 | Bisson et al. |
| 9,090,501 | B2 | 7/2015 | Okahata et al. |
| 9,109,881 | B2 | 8/2015 | Roussev et al. |
| 9,140,543 | B1 | 9/2015 | Allan et al. |
| 9,156,724 | B2 | 10/2015 | Gross |
| 9,223,162 | B2 | 12/2015 | Deforest et al. |
| 9,240,437 | B2 | 1/2016 | Shieh et al. |
| 9,278,500 | B2 | 3/2016 | Filipp |
| 9,278,655 | B2 | 3/2016 | Jones et al. |
| 9,290,413 | B2 | 3/2016 | Dejneka et al. |
| 9,346,703 | B2 | 5/2016 | Bookbinder et al. |
| 9,346,706 | B2 | 5/2016 | Bazemore et al. |
| 9,357,638 | B2 | 5/2016 | Lee et al. |
| 9,442,028 | B2 | 9/2016 | Roussev et al. |
| 9,446,723 | B2 | 9/2016 | Stepanski |
| 9,469,561 | B2 | 10/2016 | Kladias et al. |
| 9,517,967 | B2 | 12/2016 | Dejneka et al. |
| 9,573,843 | B2 | 2/2017 | Keegan et al. |
| 9,593,042 | B2 | 3/2017 | Hu et al. |
| 9,595,960 | B2 | 3/2017 | Wilford |
| 9,606,625 | B2 | 3/2017 | Levesque et al. |
| 9,617,180 | B2 | 4/2017 | Bookbinder et al. |
| 9,663,396 | B2 | 5/2017 | Miyasaka et al. |
| 9,694,570 | B2 * | 7/2017 | Levasseur ......... B32B 17/10036 |
| 9,700,985 | B2 | 7/2017 | Kashima et al. |
| 9,701,564 | B2 | 7/2017 | Bookbinder et al. |
| 9,720,450 | B2 | 8/2017 | Choi et al. |
| 9,724,727 | B2 | 8/2017 | Domey et al. |
| 9,802,485 | B2 | 10/2017 | Masuda et al. |
| 9,815,730 | B2 | 11/2017 | Marjanovic et al. |
| 9,821,509 | B2 | 11/2017 | Kastell |
| 9,895,975 | B2 | 2/2018 | Lee et al. |
| 9,902,640 | B2 | 2/2018 | Dannoux et al. |
| 9,931,817 | B2 | 4/2018 | Rickerl |
| 9,933,820 | B2 | 4/2018 | Helot et al. |
| 9,947,882 | B2 | 4/2018 | Zhang et al. |
| 9,955,602 | B2 | 4/2018 | Wildner et al. |
| 9,957,190 | B2 | 5/2018 | Finkeldey et al. |
| 9,963,374 | B2 | 5/2018 | Jouanno et al. |
| 9,972,645 | B2 | 5/2018 | Kim |
| 9,975,801 | B2 | 5/2018 | Maschmeyer et al. |
| 9,992,888 | B2 | 6/2018 | Moon et al. |
| 10,005,246 | B2 | 6/2018 | Stepanski |
| 10,017,033 | B2 | 7/2018 | Fisher et al. |
| 10,042,391 | B2 | 8/2018 | Yun et al. |
| 10,074,824 | B2 | 9/2018 | Han et al. |
| 10,086,762 | B2 | 10/2018 | Uhm |

(56) References Cited

U.S. PATENT DOCUMENTS

| | | |
|---|---|---|
| 10,131,118 B2 | 11/2018 | Kang et al. |
| 10,140,018 B2 | 11/2018 | Kim et al. |
| 10,153,337 B2 | 12/2018 | Lee et al. |
| 10,175,802 B2 | 1/2019 | Boggs et al. |
| 10,191,199 B2 | 1/2019 | Nichol et al. |
| 10,211,416 B2 | 2/2019 | Jin et al. |
| 10,222,825 B2 * | 3/2019 | Wang .................. H05K 5/0021 |
| 10,273,184 B2 | 4/2019 | Garner et al. |
| 10,303,223 B2 | 5/2019 | Park et al. |
| 10,303,315 B2 | 5/2019 | Jeong et al. |
| 10,326,101 B2 | 6/2019 | Oh et al. |
| 10,328,865 B2 | 6/2019 | Jung |
| 10,343,377 B2 | 7/2019 | Levasseur et al. |
| 10,347,700 B2 | 7/2019 | Yang et al. |
| 10,377,656 B2 | 8/2019 | Dannoux et al. |
| 10,421,683 B2 | 9/2019 | Schillinger et al. |
| 10,427,383 B2 | 10/2019 | Levasseur et al. |
| 10,444,427 B2 | 10/2019 | Bookbinder et al. |
| 10,483,210 B2 | 11/2019 | Gross et al. |
| 10,500,958 B2 | 12/2019 | Cho et al. |
| 10,606,395 B2 | 3/2020 | Boggs et al. |
| 10,649,267 B2 | 5/2020 | Tuan et al. |
| 10,712,850 B2 | 7/2020 | Brandao et al. |
| 10,732,753 B2 | 8/2020 | Boggs et al. |
| 10,788,707 B2 | 9/2020 | Ai et al. |
| 10,976,607 B2 | 4/2021 | Huang et al. |
| 11,016,590 B2 | 5/2021 | Brandao et al. |
| 2002/0039229 A1 | 4/2002 | Hirose et al. |
| 2004/0026021 A1 | 2/2004 | Groh et al. |
| 2004/0069770 A1 | 4/2004 | Cary et al. |
| 2004/0107731 A1 | 6/2004 | Doehring et al. |
| 2004/0154227 A1 | 8/2004 | Yoshimura |
| 2004/0258929 A1 | 12/2004 | Glaubitt et al. |
| 2005/0178158 A1 | 8/2005 | Moulding et al. |
| 2006/0227125 A1 | 10/2006 | Wong et al. |
| 2007/0188871 A1 | 8/2007 | Fleury et al. |
| 2007/0195419 A1 | 8/2007 | Tsuda et al. |
| 2007/0210621 A1 | 9/2007 | Barton et al. |
| 2007/0221313 A1 | 9/2007 | Franck et al. |
| 2007/0223121 A1 | 9/2007 | Franck et al. |
| 2007/0291384 A1 | 12/2007 | Wang |
| 2008/0031991 A1 | 2/2008 | Choi et al. |
| 2008/0093753 A1 | 4/2008 | Schuetz |
| 2008/0285134 A1 | 11/2008 | Closset et al. |
| 2008/0303976 A1 | 12/2008 | Nishizawa et al. |
| 2009/0046240 A1 | 2/2009 | Bolton |
| 2009/0096937 A1 | 4/2009 | Bauer et al. |
| 2009/0101208 A1 | 4/2009 | Vandal et al. |
| 2009/0117332 A1 | 5/2009 | Ellsworth et al. |
| 2009/0179840 A1 | 7/2009 | Tanaka et al. |
| 2009/0185127 A1 | 7/2009 | Tanaka et al. |
| 2009/0201443 A1 | 8/2009 | Sasaki et al. |
| 2009/0311497 A1 | 12/2009 | Aoki |
| 2010/0000259 A1 | 1/2010 | Ukrainczyk et al. |
| 2010/0031590 A1 | 2/2010 | Buchwald et al. |
| 2010/0065342 A1 | 3/2010 | Shaikh |
| 2010/0103138 A1 | 4/2010 | Huang et al. |
| 2010/0182143 A1 | 7/2010 | Lynam |
| 2010/0245253 A1 | 9/2010 | Rhyu et al. |
| 2010/0247977 A1 | 9/2010 | Tsuchiya et al. |
| 2011/0057465 A1 | 3/2011 | Beau et al. |
| 2011/0078832 A1 | 3/2011 | Koecher et al. |
| 2011/0148267 A1 | 6/2011 | McDaniel et al. |
| 2012/0050975 A1 | 3/2012 | Garelli et al. |
| 2012/0111056 A1 | 5/2012 | Prest |
| 2012/0128952 A1 | 5/2012 | Miwa et al. |
| 2012/0134025 A1 | 5/2012 | Hart |
| 2012/0144866 A1 | 6/2012 | Liu et al. |
| 2012/0152897 A1 | 6/2012 | Cheng et al. |
| 2012/0196110 A1 | 8/2012 | Murata et al. |
| 2012/0202030 A1 | 8/2012 | Kondo et al. |
| 2012/0218640 A1 | 8/2012 | Gollier et al. |
| 2012/0263945 A1 | 10/2012 | Yoshikawa |
| 2012/0280368 A1 | 11/2012 | Garner et al. |
| 2012/0320509 A1 | 12/2012 | Kim et al. |
| 2013/0020007 A1 | 1/2013 | Niiyama et al. |
| 2013/0033885 A1 | 2/2013 | Oh et al. |
| 2013/0070340 A1 | 3/2013 | Shelestak et al. |
| 2013/0081428 A1 | 4/2013 | Liu et al. |
| 2013/0088441 A1 | 4/2013 | Chung et al. |
| 2013/0120850 A1 | 5/2013 | Lambert et al. |
| 2013/0186141 A1 | 7/2013 | Henry |
| 2013/0209824 A1 | 8/2013 | Sun et al. |
| 2013/0279188 A1 | 10/2013 | Entenmann et al. |
| 2013/0314642 A1 | 11/2013 | Timmerman et al. |
| 2013/0329346 A1 | 12/2013 | Dannoux et al. |
| 2013/0330495 A1 | 12/2013 | Maatta et al. |
| 2014/0014260 A1 | 1/2014 | Chowdhury et al. |
| 2014/0036428 A1 | 2/2014 | Seng et al. |
| 2014/0065374 A1 | 3/2014 | Tsuchiya et al. |
| 2014/0141206 A1 | 5/2014 | Gillard et al. |
| 2014/0146538 A1 | 5/2014 | Zenker et al. |
| 2014/0153234 A1 | 6/2014 | Knoche et al. |
| 2014/0153894 A1 | 6/2014 | Jenkins et al. |
| 2014/0168153 A1 | 6/2014 | Deichmann et al. |
| 2014/0168546 A1 | 6/2014 | Magnusson et al. |
| 2014/0234581 A1 | 8/2014 | Immerman et al. |
| 2014/0308464 A1 | 10/2014 | Levasseur et al. |
| 2014/0312518 A1 | 10/2014 | Levasseur et al. |
| 2014/0333848 A1 | 11/2014 | Chen |
| 2014/0340609 A1 | 11/2014 | Taylor et al. |
| 2015/0015807 A1 | 1/2015 | Franke et al. |
| 2015/0072129 A1 | 3/2015 | Okahata et al. |
| 2015/0077429 A1 | 3/2015 | Eguchi et al. |
| 2015/0166394 A1 | 6/2015 | Marjanovic et al. |
| 2015/0168768 A1 | 6/2015 | Nagatani |
| 2015/0175478 A1 | 6/2015 | Ravichandran et al. |
| 2015/0177443 A1 | 6/2015 | Faecke et al. |
| 2015/0210588 A1 | 7/2015 | Chang et al. |
| 2015/0246424 A1 | 9/2015 | Venkatachalam et al. |
| 2015/0246507 A1 | 9/2015 | Brown et al. |
| 2015/0274585 A1 | 10/2015 | Rogers et al. |
| 2015/0322270 A1 | 11/2015 | Amin et al. |
| 2015/0336357 A1 | 11/2015 | Kang et al. |
| 2015/0351272 A1 | 12/2015 | Wildner et al. |
| 2015/0357387 A1 | 12/2015 | Lee et al. |
| 2016/0009066 A1 | 1/2016 | Nieber et al. |
| 2016/0009068 A1 | 1/2016 | Garner |
| 2016/0016849 A1 | 1/2016 | Allan |
| 2016/0039705 A1 | 2/2016 | Kato et al. |
| 2016/0052241 A1 | 2/2016 | Zhang |
| 2016/0066463 A1 | 3/2016 | Yang et al. |
| 2016/0081204 A1 | 3/2016 | Park et al. |
| 2016/0083282 A1 | 3/2016 | Jouanno et al. |
| 2016/0083292 A1 | 3/2016 | Tabe et al. |
| 2016/0091645 A1 | 3/2016 | Birman et al. |
| 2016/0102015 A1 | 4/2016 | Yasuda et al. |
| 2016/0113135 A1 | 4/2016 | Kim et al. |
| 2016/0207290 A1 | 7/2016 | Cleary et al. |
| 2016/0214889 A1 | 7/2016 | Garner et al. |
| 2016/0216434 A1 | 7/2016 | Shih et al. |
| 2016/0250982 A1 | 9/2016 | Fisher et al. |
| 2016/0252656 A1 | 9/2016 | Waldschmidt et al. |
| 2016/0259365 A1 | 9/2016 | Wang et al. |
| 2016/0272529 A1 | 9/2016 | Hong et al. |
| 2016/0297176 A1 | 10/2016 | Rickerl |
| 2016/0306451 A1 | 10/2016 | Isoda et al. |
| 2016/0313494 A1 | 10/2016 | Hamilton et al. |
| 2016/0354996 A1 | 12/2016 | Alder et al. |
| 2016/0355091 A1 | 12/2016 | Lee et al. |
| 2016/0355901 A1 | 12/2016 | Isozaki et al. |
| 2016/0375808 A1 | 12/2016 | Etienne et al. |
| 2017/0008377 A1 | 1/2017 | Fisher et al. |
| 2017/0021661 A1 | 1/2017 | Pelucchi |
| 2017/0066223 A1 | 3/2017 | Notsu et al. |
| 2017/0081238 A1 | 3/2017 | Jones et al. |
| 2017/0088454 A1 | 3/2017 | Fukushima et al. |
| 2017/0094039 A1 | 3/2017 | Lu |
| 2017/0115944 A1 | 4/2017 | Oh et al. |
| 2017/0158551 A1 | 6/2017 | Bookbinder et al. |
| 2017/0160434 A1 | 6/2017 | Hart et al. |
| 2017/0185289 A1 | 6/2017 | Kim et al. |
| 2017/0190152 A1 | 7/2017 | Notsu et al. |
| 2017/0197561 A1 | 7/2017 | Mcfarland |

(56) References Cited

U.S. PATENT DOCUMENTS

| | | |
|---|---|---|
| 2017/0213872 A1 | 7/2017 | Jinbo et al. |
| 2017/0217290 A1 | 8/2017 | Yoshizumi et al. |
| 2017/0217815 A1 | 8/2017 | Dannoux et al. |
| 2017/0240772 A1 | 8/2017 | Dohner et al. |
| 2017/0247291 A1 | 8/2017 | Hatano et al. |
| 2017/0262057 A1 | 9/2017 | Knittl et al. |
| 2017/0263690 A1 | 9/2017 | Lee et al. |
| 2017/0274627 A1 | 9/2017 | Chang et al. |
| 2017/0285227 A1 | 10/2017 | Chen et al. |
| 2017/0305786 A1 | 10/2017 | Roussev et al. |
| 2017/0327402 A1 | 11/2017 | Fujii et al. |
| 2017/0334770 A1 | 11/2017 | Luzzato et al. |
| 2017/0349473 A1 | 12/2017 | Moriya et al. |
| 2018/0009197 A1 | 1/2018 | Gross et al. |
| 2018/0014420 A1 | 1/2018 | Amin et al. |
| 2018/0031743 A1 | 2/2018 | Wakatsuki et al. |
| 2018/0050948 A1 | 2/2018 | Faik et al. |
| 2018/0069053 A1 | 3/2018 | Bok |
| 2018/0072022 A1 | 3/2018 | Tsai et al. |
| 2018/0103132 A1 | 4/2018 | Prushinskiy et al. |
| 2018/0111569 A1 | 4/2018 | Faik et al. |
| 2018/0122863 A1 | 5/2018 | Bok |
| 2018/0125228 A1 | 5/2018 | Porter et al. |
| 2018/0134232 A1 | 5/2018 | Helot |
| 2018/0141850 A1 | 5/2018 | Dejneka et al. |
| 2018/0147985 A1 | 5/2018 | Brown et al. |
| 2018/0149777 A1 | 5/2018 | Brown |
| 2018/0149907 A1 | 5/2018 | Gahagan et al. |
| 2018/0164850 A1 | 6/2018 | Sim et al. |
| 2018/0186674 A1 | 7/2018 | Kumar et al. |
| 2018/0188869 A1 | 7/2018 | Boggs et al. |
| 2018/0208131 A1 | 7/2018 | Mattelet et al. |
| 2018/0208494 A1 | 7/2018 | Mattelet et al. |
| 2018/0210118 A1 | 7/2018 | Gollier et al. |
| 2018/0215125 A1 | 8/2018 | Gahagan |
| 2018/0245125 A1 | 8/2018 | Tsai et al. |
| 2018/0290438 A1 | 10/2018 | Notsu et al. |
| 2018/0304825 A1 | 10/2018 | Mattelet et al. |
| 2018/0324964 A1 | 11/2018 | Yoo et al. |
| 2018/0345644 A1 | 12/2018 | Kang et al. |
| 2018/0364760 A1 | 12/2018 | Ahn et al. |
| 2018/0374906 A1 | 12/2018 | Everaerts et al. |
| 2019/0034017 A1 | 1/2019 | Boggs et al. |
| 2019/0039352 A1 | 2/2019 | Zhao et al. |
| 2019/0039935 A1 | 2/2019 | Couillard et al. |
| 2019/0069451 A1 | 2/2019 | Myers et al. |
| 2019/0077337 A1 | 3/2019 | Gervelmeyer |
| 2019/0152831 A1 | 5/2019 | An et al. |
| 2019/0223309 A1 | 7/2019 | Amin et al. |
| 2019/0295494 A1 | 9/2019 | Wang et al. |
| 2019/0315648 A1 | 10/2019 | Kumar et al. |
| 2019/0329531 A1 | 10/2019 | Brennan et al. |
| 2020/0064535 A1 | 2/2020 | Haan et al. |
| 2020/0301192 A1 | 9/2020 | Huang et al. |
| 2021/0055599 A1 | 2/2021 | Chen et al. |

FOREIGN PATENT DOCUMENTS

| | | | |
|---|---|---|---|
| CN | 1860081 A | 11/2006 | |
| CN | 101320182 A | 12/2008 | |
| CN | 101496083 A | 7/2009 | |
| CN | 101600846 A | 12/2009 | |
| CN | 101684032 A | 3/2010 | |
| CN | 201989544 U | 9/2011 | |
| CN | 102341356 A | 2/2012 | |
| CN | 102464456 A | 5/2012 | |
| CN | 102566841 A | 7/2012 | |
| CN | 103136490 A | 6/2013 | |
| CN | 103587161 A | 2/2014 | |
| CN | 203825589 U | 9/2014 | |
| CN | 204111583 U | 1/2015 | |
| CN | 104380715 A | 2/2015 | |
| CN | 104656999 A | 5/2015 | |
| CN | 104679341 A | 6/2015 | |
| CN | 204439971 U | 7/2015 | |
| CN | 204463066 U | 7/2015 | |
| CN | 104843976 A | 8/2015 | |
| CN | 105118391 A | 12/2015 | |
| CN | 105511127 A | 4/2016 | |
| CN | 205239166 U | 5/2016 | |
| CN | 105705330 A | 6/2016 | |
| CN | 106256794 A | 12/2016 | |
| CN | 205905907 U | 1/2017 | |
| CN | 106458683 A | 2/2017 | |
| CN | 206114596 U | 4/2017 | |
| CN | 206114956 U | 4/2017 | |
| CN | 107613809 A | 1/2018 | |
| CN | 107757516 A | 3/2018 | |
| CN | 108519831 A | 9/2018 | |
| CN | 108550587 A | 9/2018 | |
| CN | 108725350 A | 11/2018 | |
| CN | 109135605 A | 1/2019 | |
| CN | 109690662 A | 4/2019 | |
| CN | 109743421 A | 5/2019 | |
| DE | 4415787 A1 | 11/1995 | |
| DE | 4415878 A1 | 11/1995 | |
| DE | 69703490 T2 | 5/2001 | |
| DE | 102004022008 A1 | 12/2004 | |
| DE | 102004002208 A1 | 8/2005 | |
| DE | 202008012502 U1 * | 12/2009 | .......... E04F 13/0837 |
| DE | 102009021938 A1 | 11/2010 | |
| DE | 102010007204 A1 | 8/2011 | |
| DE | 102013214108 A1 | 2/2015 | |
| DE | 102014116798 A1 | 5/2016 | |
| EP | 0076924 A2 | 4/1983 | |
| EP | 0241355 A1 | 10/1987 | |
| EP | 0316224 A1 | 5/1989 | |
| EP | 0347049 A2 | 12/1989 | |
| EP | 0418700 A1 | 3/1991 | |
| EP | 0423698 A1 | 4/1991 | |
| EP | 0525970 A1 | 2/1993 | |
| EP | 0664210 A1 | 7/1995 | |
| EP | 1013622 A1 | 6/2000 | |
| EP | 1031409 A1 | 8/2000 | |
| EP | 1046493 A2 | 10/2000 | |
| EP | 0910721 B1 | 11/2000 | |
| EP | 1647663 A1 | 4/2006 | |
| EP | 2236281 A1 | 10/2010 | |
| EP | 2385630 A2 | 11/2011 | |
| EP | 2521118 A2 | 11/2012 | |
| EP | 2852502 A2 | 4/2015 | |
| EP | 2933718 A1 | 10/2015 | |
| EP | 3093181 A2 | 11/2016 | |
| EP | 3100854 A1 | 12/2016 | |
| EP | 3118174 A1 | 1/2017 | |
| EP | 3118175 A1 | 1/2017 | |
| EP | 3144141 A1 | 3/2017 | |
| EP | 3156286 A1 | 4/2017 | |
| EP | 3189965 A1 | 7/2017 | |
| EP | 3288791 A1 | 3/2018 | |
| EP | 3315467 A2 | 5/2018 | |
| EP | 3426614 A1 | 1/2019 | |
| EP | 3532442 A1 | 9/2019 | |
| FR | 2750075 A1 | 12/1997 | |
| FR | 2918411 A1 | 1/2009 | |
| FR | 3012073 A1 | 4/2015 | |
| GB | 0805770 A | 12/1958 | |
| GB | 0991867 A | 5/1965 | |
| GB | 1319846 A | 6/1973 | |
| GB | 2011316 A | 7/1979 | |
| GB | 2281542 A | 3/1995 | |
| JP | 55-154329 | 12/1980 | |
| JP | 57-048082 A | 3/1982 | |
| JP | 58-073681 A | 5/1983 | |
| JP | 58-194751 | 11/1983 | |
| JP | 59-076561 A | 5/1984 | |
| JP | 60-222316 A | 11/1985 | |
| JP | 63-089317 A | 4/1988 | |
| JP | 63-190730 | 8/1988 | |
| JP | 03-059337 U | 6/1991 | |
| JP | 3059337 U | 6/1991 | |
| JP | 03-228840 A | 10/1991 | |
| JP | 04-119931 | 4/1992 | |
| JP | 05-116972 A | 5/1993 | |

(56) References Cited

FOREIGN PATENT DOCUMENTS

| | | |
|---|---|---|
| JP | 06-340029 A | 12/1994 |
| JP | 07-257169 A | 10/1995 |
| JP | 10-218630 A | 8/1998 |
| JP | 11-001349 A | 1/1999 |
| JP | 11-006029 A | 1/1999 |
| JP | 11-060293 A | 3/1999 |
| JP | 2000-260330 A | 9/2000 |
| JP | 2002-255574 A | 9/2002 |
| JP | 2003-500260 A | 1/2003 |
| JP | 2003-276571 A | 10/2003 |
| JP | 2003-321257 A | 11/2003 |
| JP | 2004-101712 A | 4/2004 |
| JP | 2004-284839 A | 10/2004 |
| JP | 2006-181936 A | 7/2006 |
| JP | 2007-188035 A | 7/2007 |
| JP | 2007-197288 A | 8/2007 |
| JP | 2010-145731 A | 7/2010 |
| JP | 2012-111661 A | 6/2012 |
| JP | 2013-084269 A | 5/2013 |
| JP | 2014-126564 A | 7/2014 |
| JP | 2015-502901 A | 1/2015 |
| JP | 2015-092422 A | 5/2015 |
| JP | 5748082 B2 | 7/2015 |
| JP | 5796561 B2 | 10/2015 |
| JP | 2016-500458 A | 1/2016 |
| JP | 2016-031696 A | 3/2016 |
| JP | 2016-517380 A | 6/2016 |
| JP | 2016-130810 A | 7/2016 |
| JP | 2016-144008 A | 8/2016 |
| JP | 5976561 B2 | 8/2016 |
| JP | 2016-173794 A | 9/2016 |
| JP | 2016-530204 A | 9/2016 |
| JP | 2016-203609 A | 12/2016 |
| JP | 2016-207200 A | 12/2016 |
| JP | 6281825 B2 | 2/2018 |
| JP | 6340029 B2 | 6/2018 |
| KR | 2002-0019045 A | 3/2002 |
| KR | 10-0479282 B1 | 8/2005 |
| KR | 10-2008-0023888 A | 3/2008 |
| KR | 10-2013-0005776 A | 1/2013 |
| KR | 10-2014-0111403 A | 9/2014 |
| KR | 10-2015-0026911 A | 3/2015 |
| KR | 10-2015-0033969 A | 4/2015 |
| KR | 10-2015-0051458 A | 5/2015 |
| KR | 10-1550833 B1 | 9/2015 |
| KR | 10-2015-0121101 A | 10/2015 |
| KR | 10-2016-0118746 A | 10/2016 |
| KR | 10-1674060 B1 | 11/2016 |
| KR | 10-2016-0144008 A | 12/2016 |
| KR | 10-2017-0000208 A | 1/2017 |
| KR | 10-2017-0106263 A | 9/2017 |
| KR | 10-2017-0107124 A | 9/2017 |
| KR | 10-2017-0113822 A | 10/2017 |
| KR | 10-2017-0121674 A | 11/2017 |
| KR | 10-2018-0028597 A | 3/2018 |
| KR | 10-2018-0049484 A | 5/2018 |
| KR | 10-2018-0049780 A | 5/2018 |
| KR | 10-2019-0001864 A | 1/2019 |
| KR | 10-2019-0081264 A | 7/2019 |
| TW | 200704268 A | 1/2007 |
| TW | 201017499 A | 5/2010 |
| TW | 201438895 A | 10/2014 |
| TW | 201546006 A | 12/2015 |
| TW | 201636309 A | 10/2016 |
| TW | 201637857 A | 11/2016 |
| VN | 58334 | 7/2018 |
| WO | 94/25272 A1 | 11/1994 |
| WO | 97/39074 A1 | 10/1997 |
| WO | 98/01649 A1 | 1/1998 |
| WO | WO-9801649 A1 * | 1/1998 ....... B32B 17/10036 |
| WO | 00/73062 A1 | 12/2000 |
| WO | 2004/087590 A2 | 10/2004 |
| WO | 2006/095005 A1 | 9/2006 |
| WO | 2007/108861 A1 | 9/2007 |
| WO | 2008/042731 A1 | 4/2008 |
| WO | 2008/153484 A1 | 12/2008 |
| WO | 2009/072530 A1 | 6/2009 |
| WO | 2011/029852 A1 | 3/2011 |
| WO | 2011/144359 A1 | 11/2011 |
| WO | 2011/155403 A1 | 12/2011 |
| WO | 2012/005307 A1 | 1/2012 |
| WO | 2012/058084 A2 | 5/2012 |
| WO | 2012/166343 A2 | 12/2012 |
| WO | 2013/072611 A1 | 5/2013 |
| WO | 2013/072612 A1 | 5/2013 |
| WO | 2013/174715 A1 | 11/2013 |
| WO | 2013/175106 A2 | 11/2013 |
| WO | 2014/085663 A1 | 6/2014 |
| WO | 2014/107640 A1 | 7/2014 |
| WO | 2014/118293 A1 | 8/2014 |
| WO | 2014/172237 A2 | 10/2014 |
| WO | 2014/175371 A1 | 10/2014 |
| WO | 2015/031594 A2 | 3/2015 |
| WO | 2015/055583 A1 | 4/2015 |
| WO | 2015/057552 A2 | 4/2015 |
| WO | 2015/084902 A1 | 6/2015 |
| WO | 2015/085283 A1 | 6/2015 |
| WO | 2015/141966 A1 | 9/2015 |
| WO | 2016/007815 A1 | 1/2016 |
| WO | 2016/007843 A1 | 1/2016 |
| WO | 2016/010947 A1 | 1/2016 |
| WO | 2016/010949 A1 | 1/2016 |
| WO | 2016/044360 A1 | 3/2016 |
| WO | 2016/069113 A1 | 5/2016 |
| WO | 2016/070974 A1 | 5/2016 |
| WO | 2016/115311 A1 | 7/2016 |
| WO | 2016/125713 A1 | 8/2016 |
| WO | 2016/136758 A1 | 9/2016 |
| WO | 2016/173699 A1 | 11/2016 |
| WO | 2016/183059 A1 | 11/2016 |
| WO | 2016/195301 A1 | 12/2016 |
| WO | 2016/196531 A1 | 12/2016 |
| WO | 2016/196546 A1 | 12/2016 |
| WO | 2016/202605 A1 | 12/2016 |
| WO | 2016/208967 A2 | 12/2016 |
| WO | 2017/015392 A1 | 1/2017 |
| WO | 2017/019851 A1 | 2/2017 |
| WO | 2017/023673 A1 | 2/2017 |
| WO | 2017/106081 A1 | 6/2017 |
| WO | 2017/146866 A1 | 8/2017 |
| WO | 2017/155932 A1 | 9/2017 |
| WO | 2017/158031 A1 | 9/2017 |
| WO | 2018/005646 A1 | 1/2018 |
| WO | 2018/009504 A1 | 1/2018 |
| WO | 2018/015392 A1 | 1/2018 |
| WO | 2018/075853 A1 | 4/2018 |
| WO | 2018/081068 A1 | 5/2018 |
| WO | 2018/102332 A1 | 6/2018 |
| WO | 2018/125683 A1 | 7/2018 |
| WO | 2018/160812 A2 | 9/2018 |
| WO | 2018/200454 A1 | 11/2018 |
| WO | 2018/200807 A1 | 11/2018 |
| WO | 2018/213267 A1 | 11/2018 |
| WO | 2019/055469 A1 | 3/2019 |
| WO | 2019/055652 A1 | 3/2019 |
| WO | 2019/074800 A1 | 4/2019 |
| WO | 2019/075065 A1 | 4/2019 |
| WO | 2019/151618 A1 | 8/2019 |

OTHER PUBLICATIONS

International Preliminary Report on Patentability of the International Searching Authority; PCT/US2018/012215; dated Jul. 18, 2019; 15 Pages; European Patent Office.
International Search Report and Written Opinion of the International Searching Authority; PCT/US2018/012215 dated Aug. 1, 2018; 19 Pgs; European Patent Office.
International Search Report and Written Opinion of the International Searching Authority; PCT/US2017/040661; dated Nov. 8, 2017; 12 Pages; European Patent Office.
International Search Report and Written Opinion of the International Searching Authority; PCT/US2018/041062 dated Nov. 13, 2018; 15 Pgs; European Patent Office.

(56) References Cited

OTHER PUBLICATIONS

Invitation to Pay Additional Fees of the International Searching Authority; PCT/US2018/012215; dated May 11, 2018; 10 Pages; European Patent Office.
Jalopnik, "This Touch Screen Car Interior is a Realistic Vision of the Near Future", jalopnik.com, Nov. 19, 2014, https://jalopnik.com/this-touch-screen-car-interior-is-a-realistic-vision-of-1660846024 (Year: 2014).
Japanese Patent Application No. 2019518105; English Translation of the Office Action dated Jan. 8, 2020; Japan Patent Office; 7 Pgs.
Korean Patent Application No. 10-2019-7003171, Office Action, dated Dec. 13, 2021, 7 pages (4 pages of English Translation and 3 pages of Original Document), Korean Patent Office.
Korean Patent Application No. 10-2020-7003714 Notice of Final Rejection dated Nov. 27, 2020; 7 Pages; (4 pages of English Translation and 3 pages of Original Document). Korean Patent Office.
Korean Patent Application No. 10-2021-7008331, Office Action dated Mar. 29, 2021, 13 pages (7 page of English Translation and 6 pages of Original Document); Korean Patent Office.
Li et al., "Effective Surface Treatment on the Cover Glass for Autointerior Applications", SID Symposium Digest of Technical Papers, vol. 47, 2016, pp. 467-469.
Millard; "Bending Glass In The Parametric Age", Retrieved from: http://www.enclos.com/site-info/news/bending-glass-in-the-parametric-age, ENCLOS, 2015, pp. 1-6.
Millard; "Bending Glass in the Parametric Age"; ENCLOS; (2015); pp. 1-6; http://www.enclos.com/site-info/news/bending-glass-in-the-parametric-age.
Neugebauer et al; "Let Thin Glass in the Faade Move Thin Glass-New Possibilities for Glass in the Faade", Conference Paper Jun. 2018; 12 Pages.
Pambianchi et al; "Corning Incorporated: Designing a New Future With Glass and Optics"; Chapter 1 in "Materials Research for Manufacturing: an Industrial Perspective of Turning Materials Into New Products"; Springer Series Material Science 224, p. 12 (2016).
Pambianchi et al; "Corning Incorporated: Designing a New Future With Glass and Optics"; Chapter 1 in "Materials Research for Manufacturing: An Industrial Perspective of Turning Materials Into New Products"; Springer Series Material Science, Issue 224, 2016, pp. 12.
Pegatron Corp. "Pegaton Navigate the Future"; Ecockpit/Center Cnsole Work Premiere; Automotive World; Downloaded Jul. 12, 2017; 2 Pages.
Pegatron Corp. "Pegaton Navigate the Future"; Ecockpit/Center Console Work Premiere; Automotive Worlds, Downloaded on Jul. 12, 2017, 2 Pages.
Photodon, "Screen Protectors for Your Car's Navi System That You're Gonna Love", photodon.com, Nov. 6, 2015, https://www.photodon.com/blog/archives/screen-protectors-for-your-cars-navi-system-that-youre-gonna-love) (Year: 2015).
Scholze, H., "Glass-Water Interactions", Journal of Non-Crystalline Solids vol. 102, Issues 1-3, Jun. 1, 1988, pp. 1-10.
Stattler, "New Wave—Curved Glass Shapes Design", Glass Magazine, 2013; 2 Pages.
Stiles Custom Metal, Inc., Installation Recommendations, 2010 https://stilesdoors.com/techdata/pdf/Installation%20Recommendations%20HM%20Windows, %20Transoms%20&%>OSidelites%200710.pdf) (Year: 2010).
Taiwanese Patent Application No. 107100170, Office Action dated Jul. 9, 2021, 3 pages (English Translation Only); Taiwanese Patent Office.
Taiwanese Patent Application No. 107123694, Office Action dated Jul. 5, 2021, 2 pages (English Translation Only); Taiwanese Patent Office.
Taiwanese Patent Application No. 106122491, Search Report dated Aug. 12, 2020, 8 Pages (English Translation Only); Taiwanese Patent Office.

Tomozawa et al., "Hydrogen-to-Alkali Ratio in Hydrated Alkali Aluminosilicate Glass Surfaces", Journal of Non-Crystalline Solids, vol. 358, Issue 24, Dec. 15, 2012, pp. 3546-3550.
Translation of JP 2015092422 (abstract and description). (Year: 2015).
Translation of JP2015092422 (including bib and description). (Year: 2015).
Vakar et al; "Cold Bendable, Laminated Glass—New Possibilities in Design"; Structural Engineering International, Feb. 2004 pp. 95-97.
Vakar et al; "Cold Bendable, Laminated Glass—New Possibilities in Design"; Structural Engineering International, vol. 2, 2004, pp. 95-97.
Wang, "Polydimethylsiloxane mechanical properties measured by macroscopic compression and nanoindentation techniques", Graduate Theses and Dissertations, University of South Florida, 2011, 79 pages.
Weijde; "Graduation Plan", Jan. 2017; 30 Pages.
Werner; "Display Materials and Processes," Information Display; May 2015; 8 Pages.
Zhixin Wang, Polydimethylsiloxane mechanical properties measured by macroscopic compression and nanoindentation techniques, Graduate Theses and Dissertations, University of South Florida, 2011, 79 pages.
"Product Information Sheet", Corning® Gorilla® Glass 3 with Native Damage Resistance™, Corning Incorporated, Rev: F_090315, 2015, 2 pages.
"Stainless Steel—Grade 410 (UNS S41000)", available online at <https://www.azom.com/article.aspx?ArticleID=970>, Oct. 23, 2001, 5 pages.
"Standard Test Method for Measurement of Glass Stress—Optical Coefficient", ASTM International, Designation: C770-16, 2016.
"Stiles Custom Metal, Inc"., Installation Recommendations, Retrieved from: https://stilesdoors.com/techdata/pdf/Installation%20Recommendations%20HM%20Windows, %20Transoms%20&%>OSidelites%200710.pdf), 2010, 3 Pages.
[NPL-1] Kuribayashi (JP H07-257169 A); Oct. 1995 (EPO machine translation to English). (Year: 1995).
Ashley Klamer, "Dead front overlays", Marking Systems, Inc., Jul. 8, 2013, 2 pages.
ASTM C1279-13 "Standard Test Method for Non-Destructive Photoelastic Measurement of Edge and Surface Stresses in Annealed, Heat-Strengthened, and Fully Tempered Flat Glass"; Downloaded Jan. 24, 2018; 11 Pages.
ASTM C1422/C1422M-10 "Standard Specification for Chemically Strengthened Flat Glass"; Downloaded Jan. 24, 2018; 5 pages.
ASTM Standard C770-98 (2013), "Standard Test Method for Measurement of Glass Stress-Optical Coefficient", 2013, 8 pages.
Author Unknown; "Stress Optics Laboratory Practice Guide" 2012; 11 Pages.
Baillon et al: "An Improved Method for Manufacturing Accurate and Cheap Glass Parabolic Mirrors", Nuclear Instruments & Methods in Physics Research. Section A, Elsevier BV * North-Holland, NL, vol. A276, No. 3, 1988, 13 pages, XP000051982.
Belis et al; "Cold Bending of Laminated Glass Panels"; Heron vol. 52 (2007) No. 1/2; 24 Pages.
Burchardt et al., (Editorial Team), Elastic Bonding: The basic principles of adhesive technology and a guide to its cost-effective use in industry, 2006, 71 pages.
Byun et al; "A Novel Route for Thinning of LCD Glass Substrates"; SID 06 Digest; pp. 1786-1788, v37, 2006.
Chinese Patent Application No. 201780041822.6, Office Action dated May 6, 2021, 10 pages (English Translation Only), Chinese Patent Office.
Datsiou et al., "Behaviour of cold bent glass plates during the shaping process", Engineered Transparency. International Conference atglasstec, Dusseldorf, Germany, Oct. 21 and 22, 2014, 9 pages.
Doyle et al; "Manual on Experimental Stress Analysis"; Fifth Edition, Society for Experimental Mechanics; 31 Pages.
Doyle et al; "Manual on Experimental Stress Analysis"; Fifth Edition, Society for Experimental Mechanics; Unknown Year; 31 Pages.

(56) References Cited

OTHER PUBLICATIONS

Elziere; "Laminated Glass: Dynamic Rupture of Adhesion"; Polymers; Universite Pierre et Marie Curie—Paris VI, 2016. English; 181 Pages.
Engineering ToolBox, "Coefficients of Linear Thermal Expansion", available online at <https://www.engineeringtoolbox.com/linear-expansion-coefficients-d_95.html>, 2003, 9 pages.
European Patent Application No. 17740562.8 Communication under Rule 71(3) EPC dated Nov. 16, 2020; 6 Pages; European Patent Office.
European Patent Application No. 17740562.8 Office Action dated Dec. 18, 2019; 5 Pages; European Patent Office.
European Patent Application No. 17740562.8; Examination Report dated Dec. 18, 2019; European Patent Office; 5 Pgs.
European Patent Application No. 18704324.5 Office Action dated May 25, 2020; 3 Pages; European Patent Office.
European Patent Application No. 18753478.9 Office Action dated Jul. 23, 2020; 3 Pages; European Patent Office.
Extended European Search Report and Search Opinion; 20156137; dated Jun. 12, 2020; 7 pages; European Patent Office.
Fauercia "Intuitive HMI for a Smart Life on Board" (2018); 8 Pages http://www.faurecia.com/en/innovation/smart-life-board/intuitive-HMI.
Faurecia: Smart Pebbles, Nov. 10, 2016 (Nov. 10, 2016), XP055422209, Retrieved from the Internet: URL:https://web.archive.org/web/20171123002248/http://www.faurecia.com/en/innovation/discover-our-innovations/smart-pebbles [retrieved on Nov. 23, 2017].
Faurecia: Smart Pebbles, Nov. 10, 2016 (Nov. 10, 2016), XP055422209, Retrieved from the Internet: URL:https://web.archive.org/web/20171123002248/http://www.faurecia.com/en/innovation/discover-our-innovations/smart-pebbles[retrieved on Nov. 23, 2017], 4 Pages.
Ferwerda et al., "Perception of sparkle in anti-glare display screens", Journal of the SID, vol. 22, Issue 2, 2014, pp. 129-136.
Fildhuth et al; "Considerations Using Curved, Heat or Cold Bent Glass for Assembling Full Glass Shells", Engineered Transparency, International Conference at Glasstec, Dusseldorf, Germany, Oct. 25 and 26, 2012; 11 Pages.
Fildhuth et al; "Interior Stress Monitoring of Laminated Cold Bent Glass With Fibre Bragg Sensors", Challenging Glass 4 & Cost Action TU0905 Final Conference Louter, Bos & Belis (Eds), 2014; 8 Pages.
Fildhuth et al; "Interior Stress Monitoring of Laminated Cold Bent Glass With Fibre Bragg Sensors", Challenging Glass 4 & Cost Action TU0905 Final Conference Louter, Bos & Beus (Eds), 2014; 8 Pages.
Fildhuth et al; "Layout Strategies and Optimisation of Joint Patierns in Full Glass Shells", Challenging Glass 3—Conference on Architectural and Structural Applications of Glass, Bos, Louter, Nijsse, Veer (Eds.), Tu Delft, Jun. 2012; 13 Pages.
Fildhuth et al; "Layout Strategies and Optimisation of Joint Patterns in Full Glass Shells", Challenging Glass 3—Conference on Architectural and Structural Applications of Glass, Bos, Louter, Nijsse, Veer (Eds.), Tu Delft, Jun. 2012; 13 Pages.
Fildhuth et al; "Recovery Behaviour of Laminated Cold Bent Glass—Numerical Analysis and Testing"; Challenging Glass 4 & Cost Action TU0905 Final Conference—Louter, Bos & Beus (Eds) (2014); 9 Pages.
Fildhuth; "Design and Monitoring of Cold Bent Lamination—Stabilised Glass"; ITKE 39 (2015) 270 Pages.
Galuppi et al; "Buckling Phenomena in Double Curved Cold-Bent Glass;" Intl. J. Non-Linear Mechanics 64 (2014) pp. 70-84.
Galuppi et al; "Buckling Phenomena in Double Curved Cold-Bent Glass;" Intl. Journal of Non-Linear Mechanics, vol. 64, 2014, pp. 70-84.
Galuppi et al; "Cold-Lamination-Bending of Glass: Sinusoidal Is Better Than Circular", Composites Part B, 79, 2015, pp. 285-300.
Galuppi et al; "Large Deformations and Snap-Through Instability of Cold-Bent Glass"; Challenging Glass 4 & Cost Action TU0905 Final Conference, 2014, pp. 681-689.
Galuppi et al; "Optical Cold Bending of Laminated Glass"; International Journal of Solids and Structures, vol. 67-68, 2015, pp. 231-243.
Galuppi et al; "Optimal Cold Bending of Laminated Glass"; Internaitonal Journal of Solids and Structures, 67-68 (2015) pp. 231-243.
Galuppi L et al: "Optimal cold bending of laminated glass", Jan. 1, 2007 vol . 52, No. 1/2 Jan. 1, 2007 (Jan. 1, 2007), pp. 123-146.
Glass, Bos, Louter, Nijsse, Veer (Eds ), Tu Delft, Jun. 2012; 13 Pages.
Gollier et al., "Display Sparkle Measurement and Human Response", SID Symposium Digest of Technical Papers, vol. 44, Issue 1, 2013, pp. 295-297.

* cited by examiner

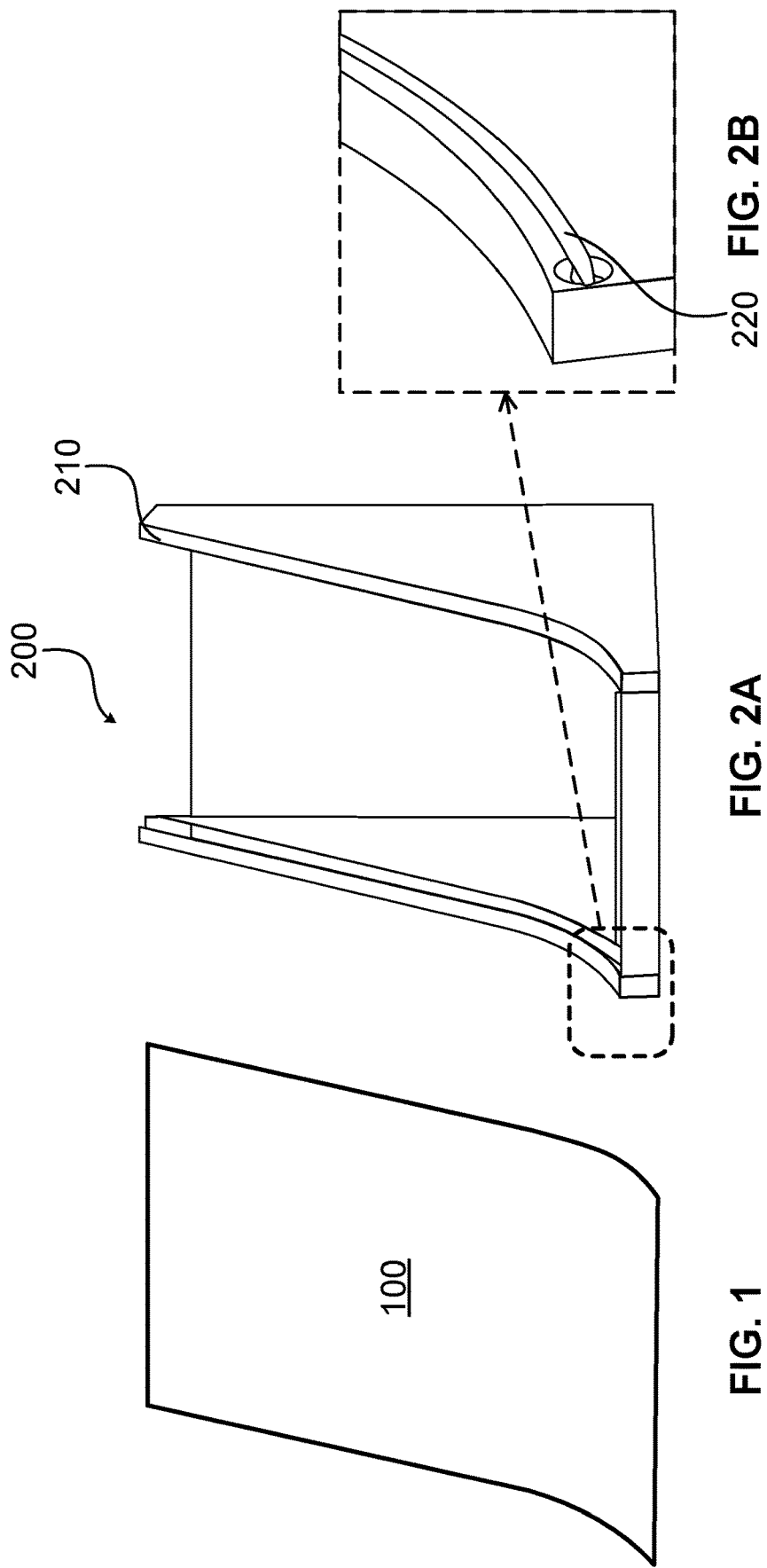

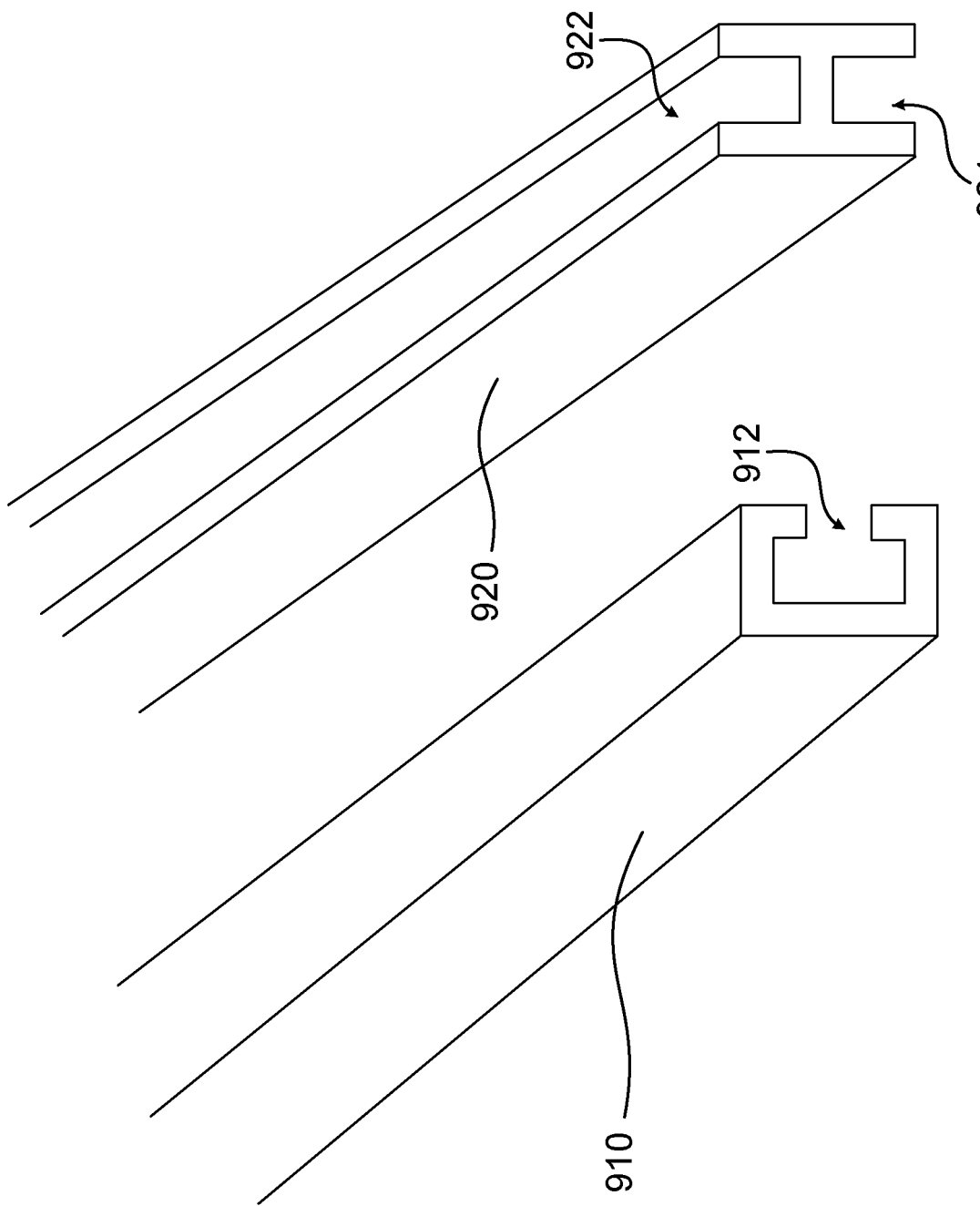

COLD-FORMED GLASS ARTICLE AND ASSEMBLY PROCESS THEREOF

CROSS-REFERENCE TO RELATED APPLICATIONS

This application is a continuation and claims the benefit of priority under 35 U.S.C. § 120 of U.S. patent application Ser. No. 17/010,509, filed on Sep. 2, 2020, which is a continuation and claims the benefit of priority under 35 U.S.C. § 120 of U.S. patent application Ser. No. 16/315,457, filed on Jan. 4, 2019, which is a national stage application under 35 U.S.C. § 371 of International Patent Application Serial No. PCT/US2017/040661, filed Jul. 5, 2017, which claims the benefit of priority under 35 U.S.C. § 119 of U.S. Provisional Application Ser. No. 62/358,278 filed on Jul. 5, 2016 and U.S. Provisional Application Ser. No. 62/458,692 filed on Feb. 14, 2017, the contents of which are relied upon and incorporated herein by reference in their entirety.

BACKGROUND

The present disclosure relates to curved cold-formed glass substrates, articles including such glass substrates, and related processes.

Curved glass substrates are desirable in many contexts. One such context is for use as a cover glass for a curved display, which may be incorporated into an appliance, an architectural element (e.g., wall, window, modular furniture, shower door, mirrors, etc.), a vehicle (e.g., automobiles, aircraft, sea craft, and the like), or other applications. Existing methods of forming such curved glass substrates, such as thermal forming, have drawbacks including high cost, optical distortion, and surface marking. Accordingly, there is a need for curved glass substrates that do not exhibit the optical distortion and surface marking typically found in thermally-formed curved glass substrates. Accordingly, there is a need for curved glass substrates that do not exhibit the optical distortion and surface marking typically found in thermally-formed curved glass substrates, while maintaining superior display quality.

BRIEF SUMMARY

The present disclosure is directed to articles comprising a curved cold-formed glass substrate and a plurality of separate mechanical retainers attached to the cold-formed glass substrate, and methods of making such articles.

A first aspect of this disclosure pertains to, an article comprising a cold-formed glass substrate having a curved shape, a plurality of separate mechanical retainers, and a frame. The cold-formed glass substrate has a first major surface and a second major surface opposing the first major surface. The cold-formed glass substrate also has a minor surface that is orthogonal to the first and major surfaces, and has an area.

In some embodiments, the plurality of separate mechanical retainers is attached to the second major surface of the cold-formed glass substrate. In some embodiments, the mechanical retainers are attached to the frame such that one or both the mechanical retainers and the frame maintain the curved shape of the cold-formed glass substrate. In some embodiments, the mechanical retainers, in the absence of the frame, maintain do not define or maintain the curved shape of the cold-formed glass substrate. In some embodiments, at least a portion of the plurality of mechanical retainers comprises a metal or plastic material. In one or more embodiments, the article includes an adhesive or mechanical fastener (i.e., a bolt and nut, clip or the like) to attach the plurality of mechanical retainers to the second major surface of the cold-formed glass substrate. In one or more embodiments, the article further comprises an adhesive to secure at least one of the plurality of mechanical retainers to the frame.

In one or more embodiments, at least a portion of the minor surface area is exposed (i.e., at least a portion of the minor surface area is visible and not covered by the frame or a surrounding component). In some embodiments, at least 80% of the minor surface area of the cold-formed glass substrate is exposed. For example, at least 85%, 90%, 95% or 100% of the minor surface area of the cold-formed glass substrate may be exposed. In some embodiments, all of the minor surface area of the cold-formed glass substrate is exposed. In some embodiments, the entirety of the first major surface is exposed relative to the frame.

In one or more embodiments, the mechanical retainers are fixedly attached to the second major surface of the cold-formed glass substrate. In some embodiments, the mechanical retainers are removably attached to the frame. In some embodiments, the mechanical retainers are inserted into at least one recess in the frame In some embodiments, each of the plurality of mechanical retainers comprises a guide block attached to the second major surface of the cold-formed glass substrate, and a guide pin protruding from the guide block. In one or more embodiments, the frame has a corresponding structure for engaging at least a portion of the plurality of mechanical retainers such as, for example the guide pin. Such structure can include a groove or a recess in the frame. In one or more embodiments, at least a portion of the guide pin is inserted into at least one groove or at least one recess in the frame.

In some embodiments, at least a portion of or each of the plurality of mechanical retainers comprises a first guide block and a second guide block each attached to the second major surface of the cold-formed glass substrate, and a guide rail extending between and through the first and second guide blocks. The guide rail protrudes in two directions from each of the first and second guide blocks. A first end of the guide rail is inserted into a first groove in the frame, and a second end of the guide rail is inserted into a second groove in the frame.

In one or more embodiments, at least a portion of or each of the plurality of mechanical retainers comprises a flexible strip that extending along at least 80% of a dimension (i.e., length or width) of the cold-formed glass substrate, such as at least 80%, 85%, 90%, 95%, or 100% of the dimension of the cold-formed glass substrate. In some embodiments, at least a portion of or each of the plurality of mechanical retainers comprises is a flexible strip that extending along at least 95% of a dimension of the cold-formed glass substrate, such as at least 95%, 96%, 97%, 98%, 99%, or 100% of the dimension of the cold-formed glass substrate.

In some embodiments, the article further comprises at least one coating, at least one surface treatment, or a combination of a coating and a surface treatment disposed on at least one of the first and the second major surfaces of the cold-formed glass substrate. In some embodiments, the at least one coating is selected from the group consisting of an ink coating, an anti-reflective coating, an anti-glare coating, an easy-to-clean coating, a conductive coating, and a haptic coating. The surface treatment may include an antiglare surface, a haptic surface that provides tactile feedback, raised and recessed portions providing indicia In some embodiments, the thickness of the at least one coating does not vary by more than 5% over the coated area, such as not more than 5%, 4%, 3%, 2%, or 1% over the coated area.

In one or more embodiments, the article further comprises a display attached to the second major surface of the cold-formed glass substrate. In one or more embodiments, the article includes an air gap between the second major surface and the display. In one or more embodiments, the display is in direct contact with the second major surface.

In one or more embodiments, the frame is not visible through the cold-formed glass substrate.

In one or more embodiments, the cold-formed glass substrate is a strengthened glass substrate. The strengthened glass may include a chemically strengthened glass, a thermally strengthened glass, a mechanically strengthened glass or a glass that has been strengthened using any one or more of chemical strengthening, thermal strengthening and mechanical strengthening.

Another aspect of this disclosure pertains to an article comprising a flexible glass substrate and a plurality of separate mechanical retainers. The flexible glass substrate has a first major surface and a second major surface opposing the first major surface. In some embodiments, at least one of the plurality of mechanical retainers is attached to the second major surface of the flexible glass substrate such that the glass substrate maintains its flexibility.

In some embodiments, the article further comprises a display attached to the second major surface of the flexible glass substrate. In one or more embodiments, the display is flexible maintains its flexibility when attached to the second major surface. In some embodiments, the article further comprises a frame. In one or more embodiments, at least at least one of the plurality of separate mechanical retainers is attached to the frame to cold-form the flexible glass substrate to a curved shape.

Another aspect of this disclosure pertains to a process comprising attaching a plurality of separate mechanical retainers to a flexible glass substrate such that the glass substrate maintains its flexibility; and attaching at least one of the plurality of separate mechanical retainers to a frame to cold-form the flexible glass substrate to a curved shape. In some embodiments, the process further comprises attaching at least one of the plurality of separate mechanical retainers to one of the opposing major surfaces of the glass substrate.

In some embodiments, the process includes removably attaching at least one of the plurality of separate mechanical retainers to the frame to cold-form the flexible glass substrate to the curved shape.

In some embodiments, the process further comprises, prior to attaching at least one of the plurality of separate mechanical retainers to the frame, applying at least one coating or surface treatment on at least one of the opposing major surfaces of the glass substrate. In one or more embodiments, the process includes applying at least one coating or surface treatment on at least one of the opposing major surfaces of the glass substrate before attaching at least one of the plurality of separate mechanical retainers to one of the opposing major surfaces of the glass substrate.

In some embodiments, the process further comprises, prior to attaching at least one of the plurality of separate mechanical retainers to the frame, attaching a display to one of the opposing major surfaces of the glass substrate. In one or more embodiments, the process includes attaching the display to one of the opposing major surfaces of the glass substrate and then attaching at least one of the plurality of separate mechanical retainers to the glass substrate. In some instances, the process includes attaching the display to one of the opposing major surfaces of the glass substrate and then attaching at least one of the plurality of separate mechanical retainers to display attached to the glass substrate.

In one or more embodiments, the frame includes one or more recesses, one or more grooves, or other structure for engaging at least one of the plurality of separate mechanical retainers. In one or more embodiments, the process includes attaching at least one of the plurality of separate mechanical retainers by inserting at least one of the plurality of the mechanical retainers into at least one recess in the frame.

In some embodiments, at least one or each of the plurality of separate mechanical retainer comprises a guide block attached to one of the opposing major surfaces of the glass substrate, and a guide pin protruding from the guide block. In some embodiments, the process comprises attaching at least one of the plurality of separate mechanical retainers to the frame by aligning at least one guide pin to one of at least one groove in the frame, and sliding the at least one guide pin into the groove.

In one or more embodiments, at least one or each of the plurality of separate mechanical retainers comprises a first guide block and a second guide block each attached to one of the opposing major surfaces of the glass substrate, and a guide rail extending between and through the first and second guide blocks. The guide rail protrudes in two directions from each of the first and second guide blocks. In some embodiments, the process includes attaching at least one of the mechanical retainers to the frame by aligning a first end of the guide rail to a first groove in the frame and a second end of the guide rail to a second groove in the frame, and sliding the first and second ends of the guide rail into the first and second grooves, respectively.

Another aspect of this disclosure pertains to a kit comprising: a flexible glass substrate having a first major surface, and a second major surface opposing the first major surface; and a plurality of mechanical retainers attached to the second major surface of the flexible glass substrate such that the glass substrate maintains its flexibility; and a frame comprising a groove or a recess for engaging at least one of the plurality of mechanical retainers.

In one or more embodiments, the kit includes a display. In one or more embodiments, the display is attached to the second major surface. In some embodiments, the display is flexible, and the flexible glass and the flexible display maintain their flexibility. In one or more embodiments, the display is curved. In one or more embodiments, the display is a liquid crystal display (LCD) or an organic light emitting display (OLED). In one or more embodiments of the kit, the frame is attached to the display. In one or more embodiments, when at least one of the plurality of mechanical retainers is engaged with the frame, an air gap is disposed between the display and the second major surface. In one or more embodiment, when at least one of the plurality of mechanical retainers is engaged with the frame, the flexible glass substrate is cold-formed to a curved shape.

In one or more embodiments, the kit comprises a flexible glass substrate having a first major surface, and a second major surface opposing the first major surface; and a plurality of mechanical retainers attached to the second major surface of the flexible glass substrate such that the glass substrate maintains its flexibility; a frame comprising a groove or a recess for engaging at least one of the plurality of mechanical retainers; and a display, wherein at least one of the plurality of mechanical retainers is engaged with the frame, and the flexible glass substrate is a cold-formed flexible glass substrate with a curved shape. In such embodiments, the display is not attached to the flexible glass substrate or the frame. In one or more embodiments, the display is flexible. In one or more embodiments, the display is curved. In one or more embodiments, the display is a liquid crystal display (LCD) or an organic light emitting display (OLED). In one or more embodiments, when the display is attached to the second surface, the display has the curved shape of the cold-formed flexible glass substrate.

BRIEF DESCRIPTION OF THE DRAWINGS

The accompanying figures, which are incorporated herein, form part of the specification and illustrate embodiments of the present disclosure. Together with the description, the figures further serve to explain the principles of and to enable a person skilled in the relevant art(s) to make and use the disclosed embodiments. These figures are intended to be illustrative, not limiting. Although the disclosure is generally described in the context of these embodiments, it should be understood that it is not intended to limit the scope of the disclosure to these particular embodiments. In the drawings, like reference numbers indicate identical or functionally similar elements.

FIG. 1 illustrates a flexible glass substrate, according to one or more embodiments.

FIG. 2A illustrates a frame having a curved shape, according to one or more embodiments.

FIG. 2B shows an enlarged view of a groove in the frame of FIG. 2A.

FIG. 9A shows a perspective view of part of a frame having a groove therein, according to one or more embodiments.

FIG. 9B shows a perspective view of part of a frame having two grooves therein, according to one or more embodiments.

DETAILED DESCRIPTION

Figure 3:
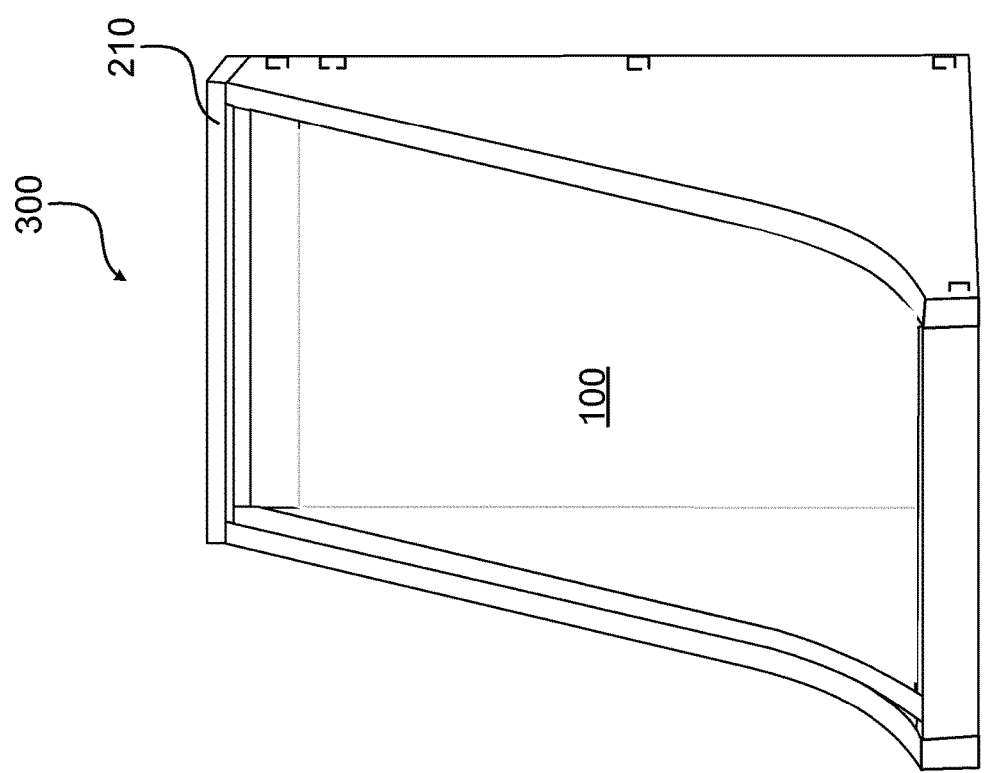
FIG. 3 illustrates an article, according to one or more embodiments, including the flexible glass substrate of FIG. 1 cold-formed to the frame of FIGS. 2A and 2B.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to. Regardless of whether a numerical value or end-point of a range recites "about," the numerical value or end-point of a range is intended to include two embodiments: one modified by "about," and one not modified by "about."

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

The term "or," as used herein, is inclusive; more specifically, the phrase "A or B" means "A, B, or both A and B." Exclusive "or" is designated herein by terms such as "either A or B" and "one of A or B," for example.

The indefinite articles "a" and "an" to describe an element or component means that one or at least one of these elements or components is present. Although these articles are conventionally employed to signify that the modified noun is a singular noun, as used herein the articles "a" and "an" also include the plural, unless otherwise stated in specific instances. Similarly, the definite article "the," as used herein also signifies that the modified noun may be singular or plural, again unless otherwise stated in specific instances.

The term "wherein" is used as an open-ended transitional phrase, to introduce a recitation of a series of characteristics of the structure.

As used herein, "comprising" is an open-ended transitional phrase. A list of elements following the transitional phrase "comprising" is a non-exclusive list, such that elements in addition to those specifically recited in the list may also be present.

Vehicle manufactures are creating interiors that better connect, protect and safely inform today's drivers and passengers. In addition, as the industry moves towards connected cars and eventually autonomous driving, there is a need for creating large format appealing displays. There is already a trend towards larger displays including touch functionality in the new models from several OEMs. Such trends are also immerging in appliances, architectural elements (e.g., wall, window, modular furniture, shower door, mirrors etc.), and other vehicles (e.g., aircraft, sea craft, and the like). However, most of these displays consist of two-dimensional plastic cover lens.

Due to these emerging trends in the vehicle interior industry and related industries, there is a need to develop a low-cost technology to make three-dimensional transparent surfaces. Strengthened glass materials, such as chemically strengthened, thermally strengthened and/or mechanically strengthened glass materials are particularly desirable for use as such surfaces, particularly where the glass substrate is used as a curved cover glass for a display.

Many methods for forming curved glass surfaces involve subjecting glass substrates to thermal forming processes, including thermal forming processes that include heating a glass substrate to a temperature above the transition temperature of the glass. Such processes can be energy intensive due to the high temperatures involved, and such processes add significant cost to the product. Furthermore, thermal forming processes may cause strength degradation or may damage any coatings present on the glass substrate. Moreover, thermal forming processes may impart undesirable characteristics onto the glass itself, such as distortion and marking.

In the auto interiors and consumer electronics industry, there is also a need to provide decorative and/or functional coatings and/or surface treatments on glass products. Decorative coatings can include ink coatings that form a pattern, design, trademarks, slogans or any words or phrases. The functional coatings can include but not limited to anti-glare, anti-reflective, easy-to-clean, decoration-ink, conductive coatings (such as indium tin oxide or ITO coatings for use in touch-sensors, silver-nanowires, carbon nanotubes, graphene, and thin films that may include any one or more of nickel, titanium, chromium (i.e., Ni-, Ti-, and/or Cr-containing thin films)), and haptic coatings. In one or more embodiments, the surface treatment may include an antiglare surface, a haptic surface that provides tactile feedback, recessed and/or raised portions providing indicia and the like.

Providing such coatings or surface treatments uniformly on three-dimensional surfaces is not only challenging but also cost prohibitive in some cases. For example, it is easier and less expensive to apply coatings and/or surface treatments on a two-dimensional flat surface. For example, anti-reflective coatings may be applied utilizing vapor deposition techniques on a flat surface, as opposed to depositing on a curved surface. Providing such coatings uniformly on a three-dimensional surface utilizing vapor deposition techniques is challenging and further adds to the cost of the process. Another example is that of decoration with ink. Conventionally screen printing (or pad printing for small parts) is the most widely used method to decorate two-dimensional flat automotive interior parts. This method has severe limitations for three-dimensional parts. Screen printing with some modifications can be used with three-dimensional parts having gentle curvature, but the process is more expensive than screen printing onto a flat surface. Therefore, there is a need to make a three-dimensional glass surface that addresses the issues mentioned herein.

Various aspects of this disclosure pertain to an article including a cold-formed glass substrate that maintains its curved shape through the use of mechanical retainers that are largely hidden from view from a user (i.e., from the first major surface). For example, at least one of the mechanical retainers may include guide pins or strips attached to the opposing major surface (i.e., the second major surface) of the glass substrate, which then attach the flexible glass substrate into a frame. The frame has a corresponding structure to engage the mechanical retainers (e.g., one or more recesses, one or more grooves or other such structure). In such a configuration, minor surface (or edges) of the cold-formed glass substrate may be free and not held or covered by a bezel. In such embodiments, at least a portion of the minor surface may be exposed or visible to the user, while the mechanical retainers are not visible. The resultant article is more appealing to the consumers, and permits a wider design space for interior automotive designers.

As will be described herein, in some embodiments, coatings and/or surface treatments can be applied on the glass substrates while the substrate is in a flat two-dimensional configuration, and the glass substrate is then curved.

The resulting articles are applicable to the vehicle manufacturing industry, and other industries such as consumer electronics (e.g., curved phones, TVs, monitors, etc.).

A first aspect of this disclosure pertains to an article comprising a flexible glass substrate having a first major surface, and a second major surface opposing the first major surface, and a plurality of separate mechanical retainers attached to the second major surface of the flexible glass substrate such that the glass substrate maintains its flexibility.

FIG. 1 illustrates an embodiment of the flexible glass substrate 100. Flexible glass substrate 100 is flexible enough to be curved into a three-dimensional shape using a cold-forming process, which maintains the high quality of glass substrate 100. Cold-forming processes can be diminished from a thermal forming process in that "cold-forming" refers to bending a glass substrate at temperatures below the transition temperature of the glass. In some embodiments, cold-forming occurs at temperatures below 800° F., such as at 700° F., 600° F., 500° F., 400° F., 310° F., 300° F., 280° F., 200° F., 100° F., 50° F., or in any range below one of these values or defined by any two of these values.

Figure 5:
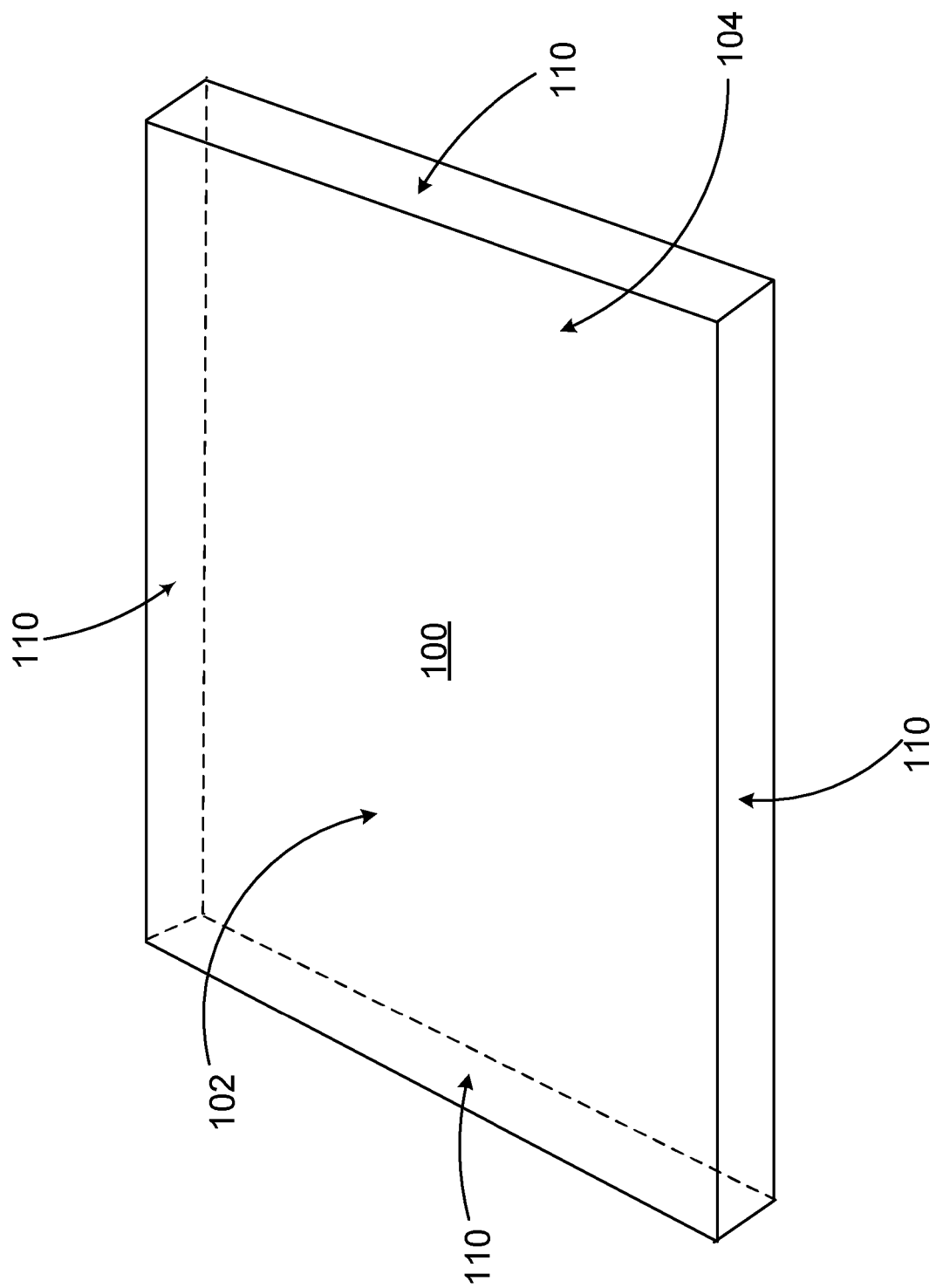
FIG. 5 shows a perspective view of a flexible glass substrate having a first major surface, a second major surface opposing the first major surface, and a minor surface, according to one or more embodiments.

Referring now to FIG. 5, flexible glass substrate 100, either in its original planar (flat) shape or in the cold-formed curved shape, has a first major surface 102, a second major surface 104 opposing first major surface 102, and a plurality of minor surfaces 110. First major surface 102 may be the upper (top or front) surface of glass substrate 100, and second major surface 104 may be the lower (bottom or back) surface of glass substrate 100, when glass substrate 100 is assembled into a fixture. A minor surface 110 is orthogonal to and between the first and second major surfaces 102, 104. The minor surface may be described as an edge.

In the embodiment shown, the flexible glass substrate has a thickness (t) that is substantially constant and is defined as a distance between the opposing major surfaces 102, 104. The thickness (t) as used herein refers to the maximum thickness of the flexible glass substrate. In one or more embodiments, the flexible glass substrate has a thickness (t) that is about 1.5 mm or less. For example, the thickness may be in a range from about 0.1 mm to about 1.5 mm, from about 0.15 mm to about 1.5 mm, from about 0.2 mm to about 1.5 mm, from about 0.25 mm to about 1.5 mm, from about 0.3 mm to about 1.5 mm, from about 0.35 mm to about 1.5 mm, from about 0.4 mm to about 1.5 mm, from about 0.45 mm to about 1.5 mm, from about 0.5 mm to about 1.5 mm, from about 0.55 mm to about 1.5 mm, from about 0.6 mm to about 1.5 mm, from about 0.65 mm to about 1.5 mm, from about 0.7 mm to about 1.5 mm, from about 0.1 mm to about 1.4 mm, from about 0.1 mm to about 1.3 mm, from about 0.1 mm to about 1.2 mm, from about 0.1 mm to about 1.1 mm, from about 0.1 mm to about 1.05 mm, from about 0.1 mm to about 1 mm, from about 0.1 mm to about 0.95 mm, from about 0.1 mm to about 0.9 mm, from about 0.1 mm to about 0.85 mm, from about 0.1 mm to about 0.8 mm, from about 0.1 mm to about 0.75 mm, from about 0.1 mm to about 0.7 mm, from about 0.1 mm to about 0.65 mm, from about 0.1 mm to about 0.6 mm, from about 0.1 mm to about 0.55 mm, from about 0.1 mm to about 0.5 mm, from about 0.1 mm to about 0.4 mm, or from about 0.3 mm to about 0.7 mm.

In one or more embodiments, the flexible glass substrate has a width in a range from about 5 cm to about 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 110 cm, from about 5 cm to about 100 cm, from about 5 cm to about 90 cm, from about 5 cm to about 80 cm, or from about 5 cm to about 75 cm.

In one or more embodiments, the flexible glass substrate has a length in a range from about 5 cm to about 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 110 cm, from about 5 cm to about 100 cm, from about 5 cm to about 90 cm, from about 5 cm to about 80 cm, or from about 5 cm to about 75 cm.

In some embodiments, the flexible glass substrate is provided as a sheet. In one or more embodiments, the flexible glass substrate may be strengthened (prior to being shaped into some embodiments of the article described herein). For example, the flexible glass substrate may be strengthened by any one or more of thermal strengthening, chemical strengthening, mechanical strengthening, or by a combination thereof. In some embodiments, the strengthened flexible glass substrate may have a compressive stress (CS) layer extending from a surface of the substrate thereof to a compressive stress depth (or depth of compressive stress layer or DOL). The depth of compression is the depth at which compressive stress switches to tensile stress. The region within the glass substrate exhibiting a tensile stress is often referred to as a central tension or CT layer.

As used herein, "thermally strengthened" refers to glass substrates that are heat treated to improve the strength of the substrate. In thermally-strengthened glass substrates, the CS layer is formed by heating the substrate to an elevated temperature above the glass transition temperature (i.e., near or approaching the glass softening point), and then cooling the glass surface regions more rapidly than the inner regions of the glass. The differential cooling rates between the surface regions and the inner regions generates a residual CS layer at the surfaces.

Factors that impact the degree of surface compression generated by thermal strengthening processes include the air-quench temperature, volume, and other variables that create a surface compression of at least 10,000 pounds per square inch (psi). In chemically strengthened glass substrates, the replacement of smaller ions by larger ions at a temperature below that at which the glass network can relax produces a distribution of ions across the surface of the glass that results in a stress profile. The larger volume of the incoming ion produces the CS layer extending from a surface and the CT layer in the center of the glass. Chemical strengthening may be achieved by an ion exchange process which includes immersion of a glass substrate into a molten salt bath for a predetermined period of time to allow ions at or near the surface(s) of the glass substrate to be exchanged for larger metal ions from the salt bath. In some embodiments, the temperature of the molten salt bath is from about 375° C. to about 450° C. and the predetermined time period is in the range from about four to about eight hours. In one example, sodium ions in a glass substrate are replaced by potassium ions from the molten bath, such as a potassium nitrate salt bath, though other alkali metal ions having larger atomic radii, such as rubidium or cesium, can replace smaller alkali metal ions in the glass. In another example, lithium ions in a glass substrate are replaced by potassium and/or sodium ions from the molten bath that may include potassium nitrate, sodium nitrate or a combination thereof, although other alkali metal ions having larger atomic radii, such as rubidium or cesium, can replace smaller alkali metal ions in the glass. In some embodiments, smaller alkali metal ions in the glass substrate can be replaced by silver ions. Similarly, other alkali metal salts such as, but not limited to, sulfates, phosphates, halides, and the like may be used in the ion exchange process. The glass substrate may be immersed in a single bath or in multiple and successive baths which may have the same or different composition and/or temperature from one another. In some embodiments, the immersion in such multiple baths may be for different periods of time from one another.

In mechanically-strengthened glass substrates, the CS layer is generated by a mismatch of the coefficient of thermal expansion between portions of the glass substrate.

In strengthened glass substrates, the DOL is related to the CT value by the following approximate relationship (Equation 1)

$$CT \cong \frac{CS \times DOL}{thickness - 2 \times DOL} \quad (1)$$

where thickness is the total thickness of the strengthened flexible glass substrate. Unless otherwise specified, CT and CS are expressed herein in megaPascals (MPa), whereas thickness and DOL are expressed in millimeters or microns. Unless otherwise described, the CS value is the value measured at the surface and the CT value is the tensile stress value (as determined by Equation 1). CS values and CT values provided herein are provided as absolute values.

In some embodiments, a strengthened flexible glass substrate (or the embodiments of the cold-formed glass substrate described herein) can have a surface CS of 300 MPa or greater, e.g., 400 MPa or greater, 450 MPa or greater, 500 MPa or greater, 550 MPa or greater, 600 MPa or greater, 650 MPa or greater, 700 MPa or greater, 750 MPa or greater or 800 MPa or greater. In some embodiments, the surface CS is the maximum CS in the glass substrate. The strengthened glass substrate (or the embodiments of the cold-formed glass substrate described herein) may have a DOL of 15 micrometers or greater, 20 micrometers or greater (e.g., 25, 30, 35, 40, 45, 50 micrometers or greater) and/or a maximum CT value of 10 MPa or greater, 20 MPa or greater, 30 MPa or greater, 40 MPa or greater (e.g., 42 MPa, 45 MPa, or 50 MPa or greater) but less than 100 MPa (e.g., 95, 90, 85, 80, 75, 70, 65, 60, 55 MPa or less). In one or more specific embodiments, the strengthened flexible glass substrate (or the embodiments of the cold-formed glass substrate described herein) has one or more of the following: a surface CS greater than 500 MPa, a DOL greater than 15 micrometers, and a maximum CT of greater than 18 MPa.

The CS and DOL may be determined by surface stress meter such as the commercially available FSM-6000 instrument, manufactured by Orihara Industrial, Co., Ltd. (Tokyo, Japan). Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2013), entitled "Standard Test Method for Measurement of Glass Stress-Optical Coefficient," the contents of which are incorporated herein by reference in their entirety, and a bulk cylinder method.

The materials for het glass substrate may be varied. The glass substrates used to form the articles described herein can be amorphous or crystalline. In this regard, the use of the term "glass" is general and is intended to encompass more than strictly amorphous materials. Amorphous glass substrates according to some embodiments can be selected from soda lime glass, alkali alumino-silicate glass, alkali containing borosilicate glass and alkali alumino-borosilicate glass. Examples of crystalline glass substrates can include glass-ceramics, sapphire or spinel. Examples of glass-ceramics include Li2O—Al2O3-SiO2 system (i.e. LAS-System) glass ceramics, MgO—Al2O3-SiO2 System (i.e. MAS-System) glass ceramics, glass ceramics including crystalline phases of any one or more of mullite, spinel, α-quartz, β-quartz solid solution, petalite, lithium disilicate, β-spodumene, nepheline, and alumina.

Glass substrates may be provided using a variety of different processes. For example, exemplary glass substrate forming methods include float glass processes and down-draw processes such as fusion draw and slot draw. A glass substrate prepared by a float glass process may be characterized by smooth surfaces and uniform thickness is made by floating molten glass on a bed of molten metal, typically tin. In an example process, molten glass that is fed onto the surface of the molten tin bed forms a floating glass ribbon. As the glass ribbon flows along the tin bath, the temperature is gradually decreased until the glass ribbon solidifies into a solid glass substrate that can be lifted from the tin onto rollers. Once off the bath, the glass substrate can be cooled further and annealed to reduce internal stress.

Down-draw processes produce glass substrate having a uniform thickness and relatively pristine surfaces. Because the average flexural strength of the glass substrate is controlled by the amount and size of surface flaws, a pristine surface that has had minimal contact has a higher initial strength. Down-drawn glass substrate may be drawn into a sheet having a thickness of less than about 2 millimeters. In addition, down drawn glass substrate have a very flat, smooth surface that can be used in its final application without costly grinding and polishing.

The fusion draw process, for example, uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing sheet of glass. The fusion draw method offers the advantage that, because the two glass films flowing over the channel fuse together, neither of the outside surfaces of the resulting sheet of glass comes in contact with any part of the apparatus. Thus, the surface properties of the fusion drawn sheet of glass are not affected by such contact.

The slot draw process is distinct from the fusion draw method. In slow draw processes, the molten raw material glass is provided to a drawing tank. The bottom of the drawing tank has an open slot with a nozzle that extends the length of the slot. The molten glass flows through the slot/nozzle and is drawn downward as a continuous sheet and into an annealing region.

Exemplary compositions for use in the flexible glass substrate or cold-formed glass substrate will now be described. One example glass composition comprises $SiO_2$, $B_2O_3$ and $Na_2O$, where $(SiO_2+B_2O_3) \geq 66$ mol. %, and $Na_2O \geq 9$ mol. %. Suitable glass compositions, in some embodiments, further comprise at least one of $K_2O$, MgO, and CaO. In some embodiments, the glass compositions can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example glass composition comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. % $(Li_2O+Na_2O+K_2O)$ 20 mol. % and 0 mol. % (MgO+CaO) 10 mol. %.

A still further example glass composition comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. % $(Li_2O+Na_2O+K_2O)$ 18 mol. % and 2 mol. % (MgO+CaO) 7 mol. %.

In some embodiments, an alkali alumino-silicate glass composition comprises alumina, at least one alkali metal and, in some embodiments, greater than 50 mol. % $SiO_2$, in some embodiments at least 58 mol. % $SiO_2$, and in some embodiments at least 60 mol. % $SiO_2$, wherein the ratio (($Al_2O_3$+$B_2O_3$)/Σmodifiers)>1, where in the ratio the components are expressed in mol. % and the modifiers are alkali metal oxides. This glass composition, in some embodiments, comprises: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio(($Al_2O_3$+$B_2O_3$)/Σmodifiers)>1.

In some embodiments, the glass substrate may include an alkali alumino-silicate glass composition comprising: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % $MgO$; and 0-5 mol. % $CaO$, wherein: 66 mol. %≤$SiO_2$+$B_2O_3$+$CaO$≤69 mol. %; $Na_2O$+$K_2O$+$B_2O_3$+$MgO$+$CaO$+$SrO$>10 mol. %; 5 mol. %≤$MgO$+$CaO$+$SrO$≤8 mol. %; ($Na_2O$+$B_2O_3$)≥$Al_2O_3$≥2 mol. %; 2 mol. %≤$Na_2O$≤$Al_2O_3$ □ 6 mol. %; and 4 mol. % ($Na_2O$+$K_2O$)≤$Al_2O_3$≤10 mol. %.

In some embodiments, the glass substrate may comprise an alkali alumino-silicate glass composition comprising: 2 mol % or more of $Al_2O_3$ and/or $ZrO_2$, or 4 mol % or more of $Al_2O_3$ and/or $ZrO_2$.

In some embodiments, the compositions used for a glass substrate may be batched with 0-2 mol. % of at least one fining agent selected from the group consisting of $Na_2SO_4$, NaCl, NaF, NaBr, $K_2SO_4$, KCl, KF, KBr, and $SnO_2$.

Although various specific glasses are described herein, in some embodiments, any cold-formable glass may be used.

The articles may include single sheet of glass or a glass laminate. In some embodiments, a laminate refers to opposing glass substrates, such as the substrates described herein. In some embodiments, the glass substrates may be separated by an interlayer, for example, poly(vinyl butyral) (PVB), ethylenevinylacetate (EVA), polyvinyl chloride (PVC), ionomers, and thermoplastic polyurethane (TPU). A glass substrate forming part of a laminate can be strengthened (chemically, thermally, and/or mechanically) as described above. Some embodiments of the articles disclosed herein are useful in automobile interiors because such articles provide a curved cover compatible with curved displays. To be compatible with a curved display, a cover should match the shape of the curved display closely to insure optimal fit and enable a high quality viewing. It is also desirable to provide a cover that is high optical quality and cost effective. Thermal forming a cover to the precise shape presents challenges in attaining that desired shape. In addition, when glass is used, it is a challenge to minimize the downside effects of heating the cover to its softening point (e.g., distortion, and marking). The concept of cold-forming addresses these issues and permits the use of glass but creates new challenges in providing a sufficient support to maintain the cold-form shape and provide rigidity. The ability to cold-form a thin glass substrate to the prescribed shape presents the opportunity for a high quality, cost effective solution.

In one or more embodiments, the flexible glass substrate 100 may include a display attached to the second major surface 104. The display may be a liquid crystal display (LCD) or an organic light-emitting diode display (OLED). In one or more embodiments, the display is flexible maintains its flexibility when attached to the second major surface. In one or more embodiments, the article includes a frame, wherein the mechanical retainers are attached to the frame to cold-form the flexible glass substrate to a curved shape.

A second aspect of this disclosure pertains to an article including a cold-formed glass substrate in a curved shape, the cold-formed glass substrate having a first major surface, and a second major surface opposing the first major surface, a plurality of separate mechanical retainers attached to the second major surface of the cold-formed glass substrate, and a frame, wherein the mechanical retainers are attached to the frame, and wherein one or both the mechanical retainers and the frame maintain the curved shape of the cold-formed glass substrate.

Figure 6:
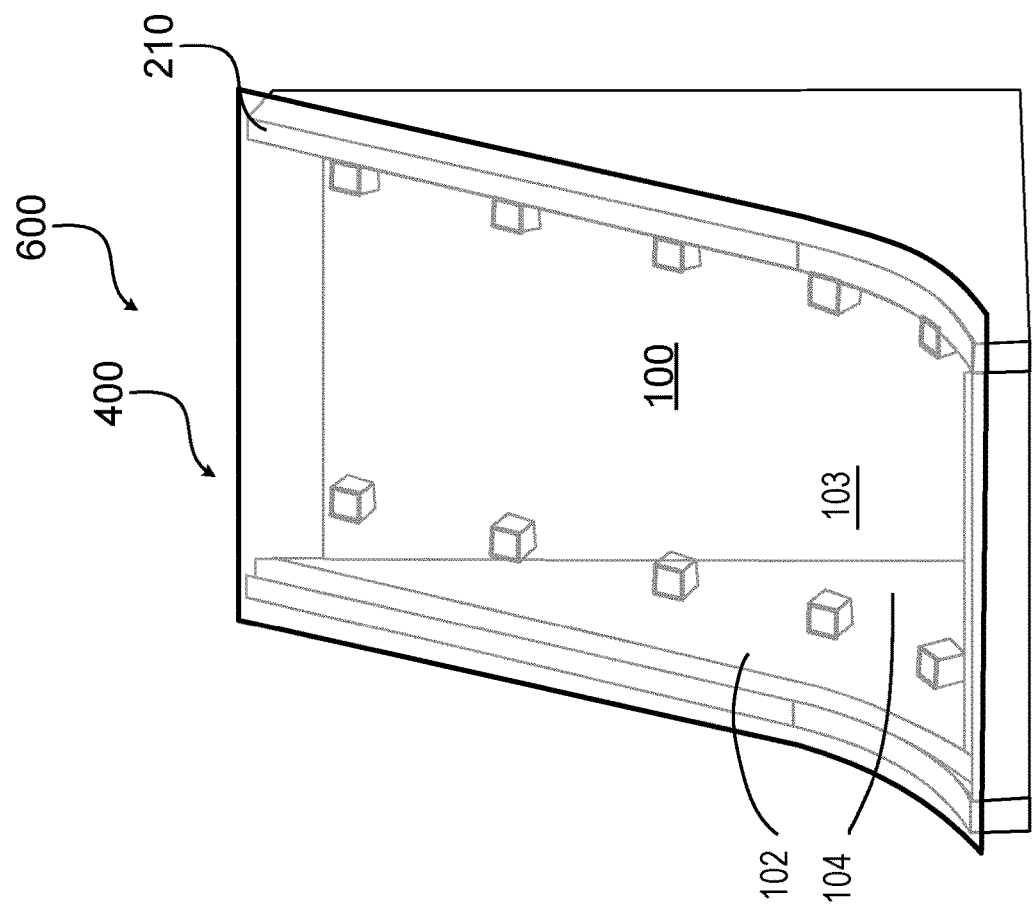
FIG. 6 illustrates an article, according to one or more embodiments, including the flexible glass substrate of FIG. 4A cold-formed to the frame of FIG. 2A.
Figure 10A:
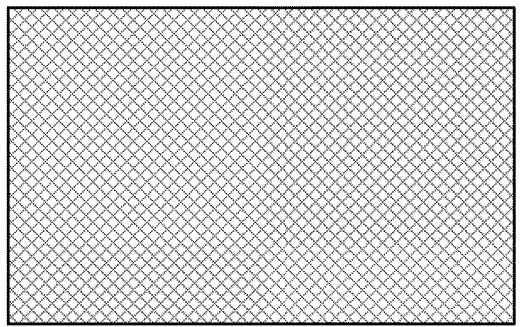
FIGS. 10A-10D depict an exemplary embodiment of a process of cold-forming a curved glass substrate with a coating thereon.
Figure 10B:
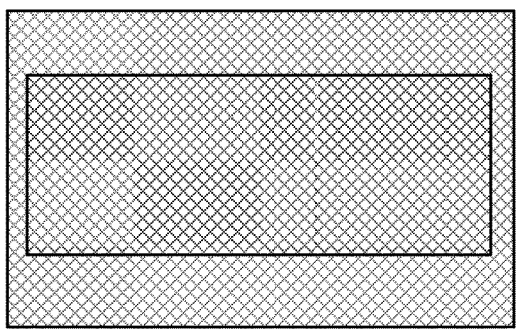
Figure 10C:
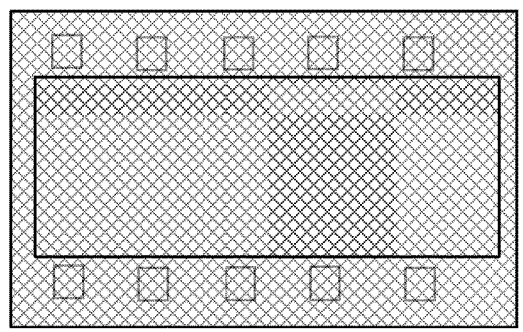
Figure 10D:
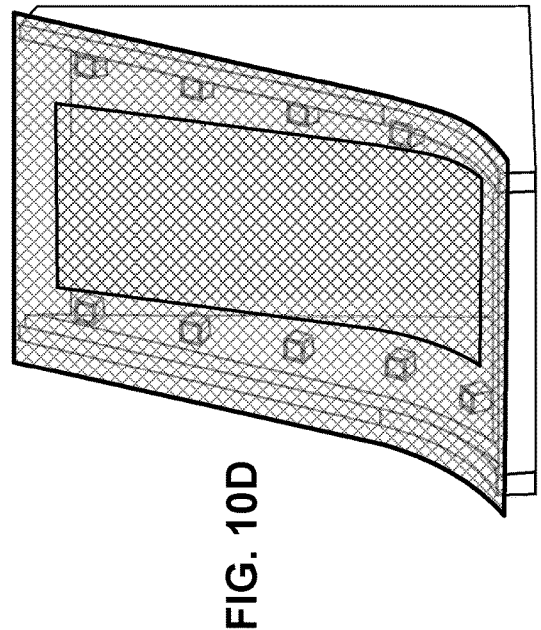

In one or more embodiments, when the flexible glass substrate 100 is cold-formed into a cold-formed glass substrate as illustrated in FIGS. 3, 6 and 10D) the opposing major surfaces 102, 104 exhibit surface stress that differs from one another, which are created during cold-forming. The stresses include surface compressive stress generated by the cold-forming process. This stress is not thermally relaxed because the glass substrate is maintained at temperatures well below the glass transition temperature.

In some embodiments, the cold-formed glass substrate exhibits a surface compressive stress on the first and second major surfaces that differ from one another at, near or adjacent the one or more non-planar points. As illustrated in FIG. 6, first and second major surfaces 102 and 104 are in tension or compression depending on the direction of curvature. First major surface 102 at position 103 is in tension, while second major surface 104 at the same position 103 is in compression. Accordingly, the first major surface 102 at position 103 exhibits a greater surface compressive stress than second major surface 104 at position 103. This is asymmetrical surface compressive stress is exhibited even when the glass substrate 100 is strengthened as described herein and exhibits a surface compressive stress prior to being cold-formed.

In some embodiments, a cold-formed glass substrate forms a "developable" surface. A developable surface has a surface with zero Gaussian curvature. In one or more embodiments, the developable surface means that all points of the cold-formed glass substrate surface have a Gaussian curvature (GC) that is equal to zero (wherein GC is equal to Kmax*Kmin, wherein Kmax and Kmin are principal curvatures defined as Kmax=1/R' and Kmin=1/R"), and wherein one of Kmax and Kmin is non-zero. R' is the maximum radius of curvature and R" is the minimum radius of curvature. In one or more embodiments, the surface of the cold-formed glass substrate can be flattened into a plane without stretching or compressing within the plane of the surface. Examples of developable surfaces include cones, cylinders, oloids, tangent developable surfaces, and portions thereof. A surface that projects onto a single curved line is a developable surface. A sphere is an example of a "non-developable" shape.

The cold-formed glass substrate is cold-formed to a curved shape and retains its curved shape due to engagement with a frame.

FIG. 2A illustrates a fixture 200 comprising a frame 210 having a curved shape or capable of cold-forming the glass substrate into a curved shape. Fixture 200 in this example is a part, a section of an automotive interior display, including but not limited to an instrument cluster, a console display, or a center stack display, having a monitor, that may be made in some embodiments. In some embodiments, fixture 200 may be any structure in which glass substrate 100 is assembled. Frame 210 includes one or more rigid members which surround, enclose, underlay, or support glass substrate 100 in a cold-formed curved shape. In FIG. 2A, two side members of frame 210 have edges in a curved shape. Frame 210 may be made of metal or plastic material. FIG. 2B shows an enlarged view of a groove 220 in frame 210 of FIG. 2A. Groove 220 is formed along the curved edge of a side member of frame 210. In some embodiments, grooves may be made in each of the members of frame 210, including two side members, top member, and bottom member. In some embodiments, recesses in other forms, such as holes, may be formed in frame 210.

FIG. 3 illustrates an article that includes a cold-formed flexible glass substrate 100 of FIG. 1 after the flexible glass substrate is inserted into grooves 220 of frame 210 of FIGS. 2A and 2B. In such embodiments, article is free of mechanical retainers. Frame 210 (and particularly, the groove 220) cold-forms the flexible glass substrate into a curved shape and maintains glass substrate 100 in a cold-formed curved shape. In this configuration, entire frame 210 or at least the outside part of frame 210 (bezel) is visible from outside of article 300. In other words, minor surfaces 110 of glass substrate 100 are not exposed as they are inserted into grooves 220 and covered by frame 210, i.e., two side members, top member, and bottom member. In some embodiments, at least part of minor surfaces 110 is covered by frame 210. For example, three of four minor surfaces 110 of glass substrate 100 may be covered the two side members and bottom member of frame 210, while the remaining minor surface is exposed and not covered by the top member of frame 210. Nevertheless, glass substrate 100 does not completely cover frame 210 in FIG. 3, thereby limiting the design flexibility for the automotive interior designers. And, if glass substrate 100 is inserted into grooves 220 such that first major surface 102 is facing outward, a part of major surface 102 is covered by a part of frame 210 to form a bezel.

Figure 4A:
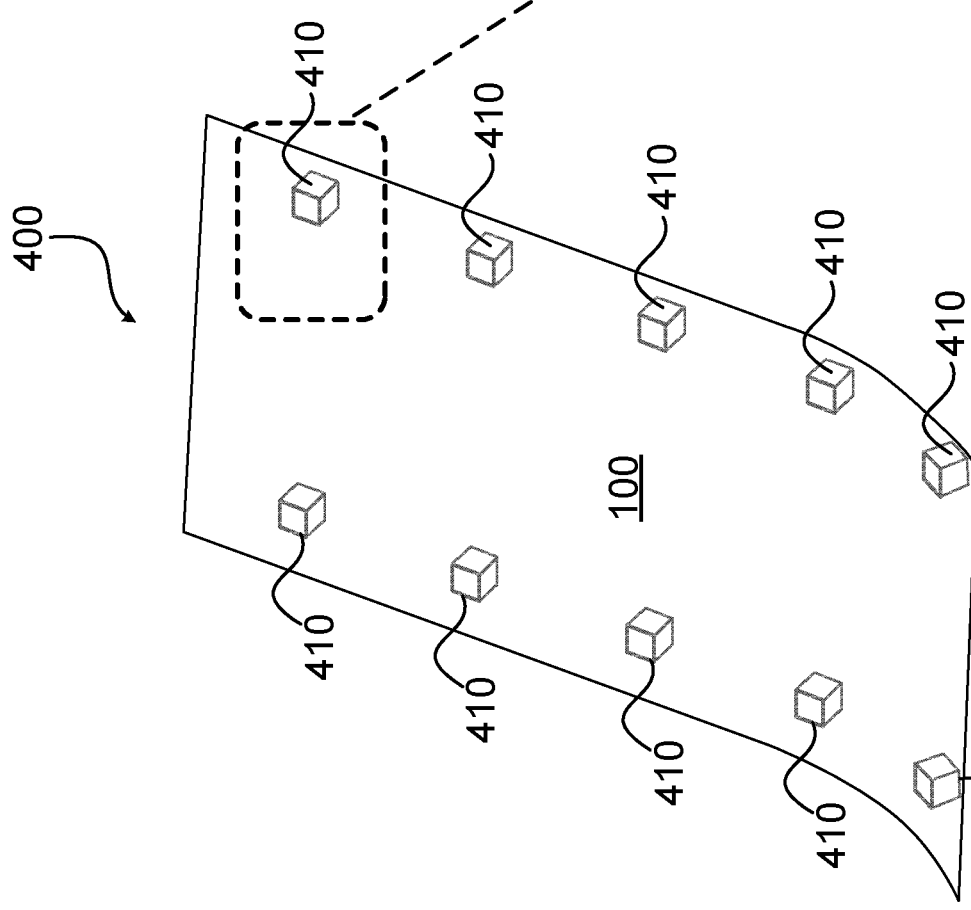
FIG. 4A illustrates a flexible glass substrate and a plurality of separate mechanical retainers attached on the flexible glass substrate, according to one or more embodiments.

FIG. 4A illustrates a flexible glass substrate 100 and a plurality of separate mechanical retainers 410 attached thereon. An article 400 includes glass substrate 100 and mechanical retainers 410 attached to second major surface 104 of glass substrate 100. In some embodiments, each mechanical retainer 410 may be made of metal or plastic material and in a rigid or flexible form. The mechanical retainers 410 may be fabricated by a variety of techniques. For example, for mechanical retainers made of plastic materials, injection molding, hot embossing, computerized numerical control (CNC) machining, or three-dimensional printing may be used.

Regardless of the number, shape, size, rigidness, and material of mechanical retainers 410, in the absence of frame 210 or any other rigid support, mechanical retainers 410 do not define a curved shape of glass substrate 100. In other words glass substrate 100 maintains its flexibility. The glass substrate 100 will tend to retain its original shape, for example a planar shape, unless mechanical forces are applied. In one or more embodiments, the mechanical retainers 410 are separate from each other, and thus they do not define a cold-formed curved shape for glass substrate 100. In one or more embodiments, when mechanical retainers are engaged with or attached to the frame, the cold-formed glass substrate has a bending force that applies at least a portion of the force required to retain the engaged or attached mechanical retainers to the frame. In one or more embodiments, an optional adhesive may be used to augment the engagement or attachment between the one or more or two or more of the plurality of mechanical retainers and the frame.

As described below in detail, in a cold-forming process, mechanical retainers 410 can be attached to frame 210 to cold-formed the glass substrate 100 into a curved shape. In some embodiments, at least part of each mechanical retainer 410 can be inserted into at least one recess, e.g., grooves or holes, in frame 210 to define positions for each mechanical retainer 410.

In some embodiments, mechanical retainers 410 may be fixedly attached to second major surface 104 of glass substrate 100. That is, mechanical retainers 410 are secured to glass substrate 100 so as not to be moved, become loose, or be lost. For example, mechanical retainers 410 may be bonded to glass substrate 100 at its second major surface 104 by applying adhesives along the interface therebetween, such as epoxies, urethanes or acrylics families of adhesives. In some embodiments, mechanical retainers 410 may be removably attached to second major surface 104 of glass substrate 100 such that mechanical retainers 410 may be taken off from glass substrate 100 if needed. For example, mechanical retainers 410 may be attached to second major surface 104 of glass substrate 100 via suction cups, removable tapes, or the like.

As described below in detail, the number, size, and/or shape of mechanical retainers 410 may vary in different embodiments. In some embodiments, because glass substrate 100 may be a cover glass of a display (not shown) attached onto second major surface 104, certain area needs to be reserved for the display or any other structure attached to glass substrate 100. Thus, in one example, mechanical retainers 410 are collectively attached to at most 50% of the area of second major surface 104 of glass substrate 100, such as at most 50%, 45%, 40%, 35%, 30%, 25%, 20%, 15%, 10%, 5%, 0%, or in any range defined by any two of these values. In some embodiments, mechanical retainers 410 may be attached to the peripheral area of second major surface 104 to avoid impairing the display or any other structure to be attached to the central area of second major surface 104 of glass substrate 100.

Figure 4B:
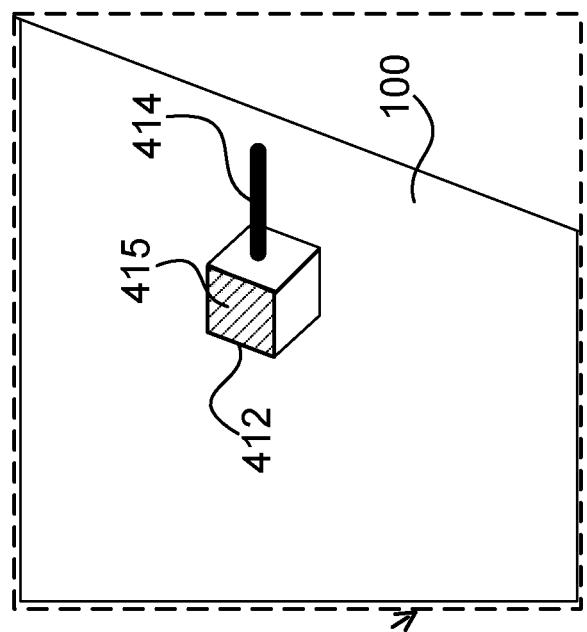
FIG. 4B shows an enlarged view of a mechanical retainer of FIG. 4A having a guide block and a guide pin protruding from the guide block.

In some embodiments, FIG. 4B shows an enlarged view of mechanical retainer 410 of FIG. 4A having a guide block 412 and a guide pin 414 protruding from guide block 412. One surface 415 of guide block 412 is attached to second major surface 104 of glass substrate 100. In some embodiments, at least part of guide pin 414 (e.g., the tip or entirety of guide pin 414) can be inserted into groove 220 in frame 210. For example, each guide pin 414 may be aligned to a corresponding groove 220 in a side member of frame 210 and slid into groove 220. A resultant article 600 is obtained in FIG. 6 including article 400 attached to frame 210 via mechanical retainers 410.

As shown in FIG. 6, mechanical retainers 410 are attached to frame 210 to define a position for each mechanical retainer 410, such that mechanical retainers 410 define the curved shape of cold-formed glass substrate 100. In some embodiments, in the cold-formed state, first and second major surfaces 102, 104 of glass substrate 100 have different surface stress. Compared to article 300 in FIG. 3 in which the edges of glass substrate 100 are slid into grooves 220, frame 210 in FIG. 6 is completely covered by glass substrate 100. Guide pins 414 are slid into grooves 220, leaving minor surfaces 110 of glass substrate 100 exposed. If a non-transparent ink coating is applied to glass substrate 100, and/or if a display is attached to glass substrate 100, frame 210 may be completely hidden from view behind glass substrate 100. Glass substrate 100 can be attached to frame 210 via mechanical retainers 410 attached to second major surface 104, so as to expose the entirety of first major surface 102 of glass substrate 100 relative to frame 210. In this manner, cold-formed glass substrate 100 has at least some area of minor surfaces 110 exposed, i.e., not being inserted into grooves 220. In some embodiments, at least 80% area of minor surfaces 110 of cold-formed glass substrate 100 is exposed, such as at least 85%, 90%, 95%, 100%, or in any range defined by any two of these values. In some embodiments, all area of minor surfaces 110 of cold-formed glass substrate 100 is exposed, for example, as shown in FIG. 6. Advantageously, in such a configuration, the edges of glass are free and not held by a bezel. The resultant product design concept provides more appeal to the consumers, and opens up design space for interior automotive designers.

Figure 7:
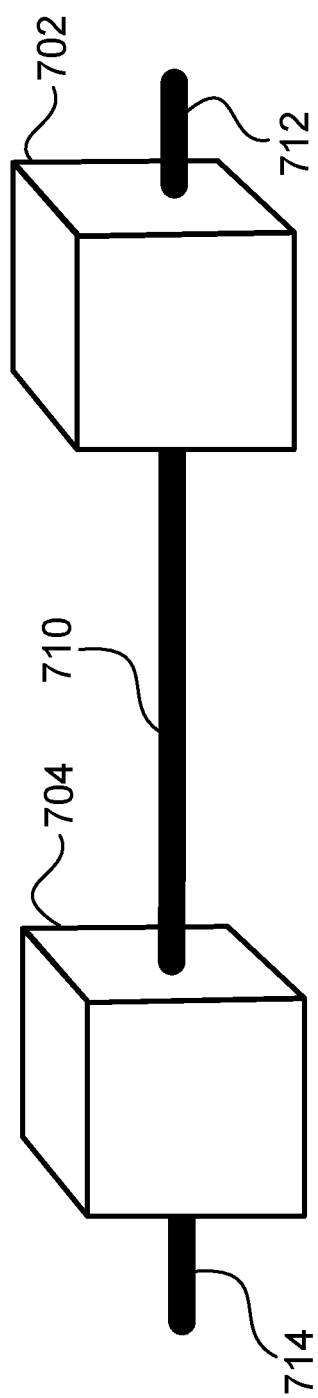
FIG. 7 illustrates a mechanical retainer having a first guide block, a second guide block, and a guide rail extending between and through the first and second guide blocks and protruding in two directions from each of the first and second guide blocks, according to one or more embodiments.

It is understood that the design of mechanical retainers 410 and/or matched grooves 220 is not limited to the examples described above. In some embodiments, FIG. 7 illustrates a mechanical retainer 410 having a first guide block 702, a second guide block 704, and a guide rail 710 extending between and through first and second guide blocks 702, 704 and protruding in two directions from each of first and second guide blocks 702, 704. Each end 712, 714 of guide rail 710 may be inserted into one of two grooves 220 of frame 210. For example, first end 712 of guide rail 710 may be aligned to a first groove 220 and second end 714 of guide rail 710 may be aligned to a second groove 220; first and second ends 712, 714 of guide rail 710 may be slid into first and second grooves 220, respectively.

Figure 8:
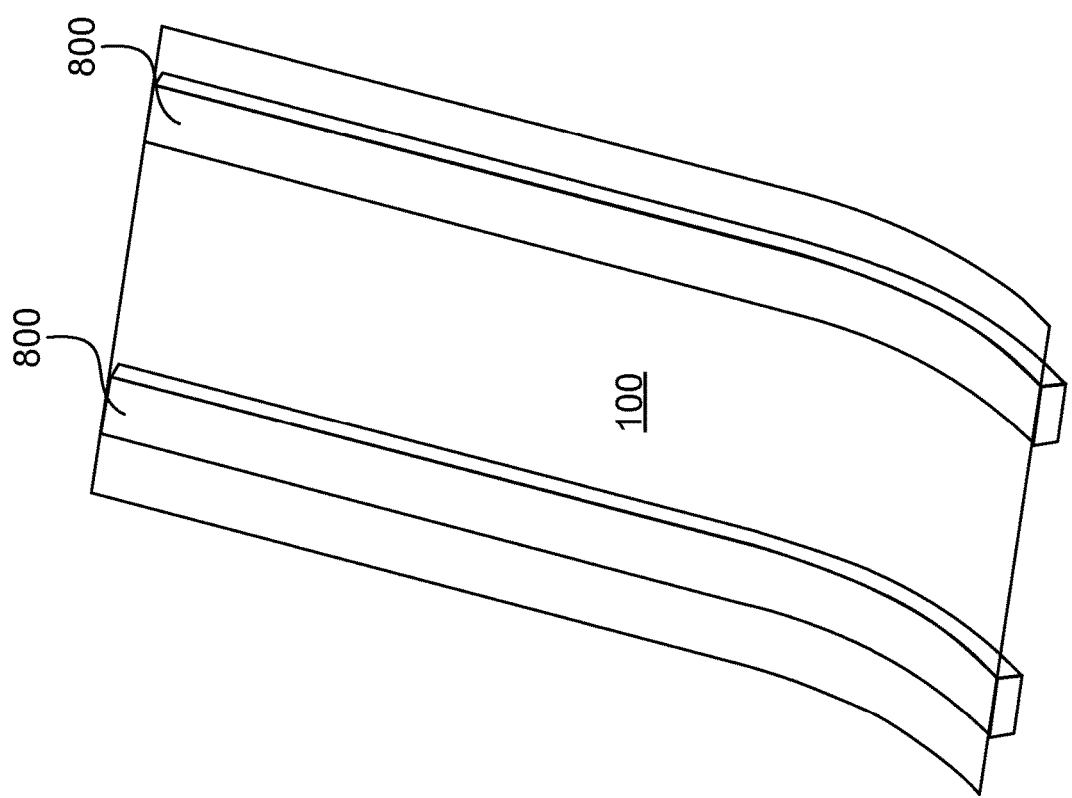
FIG. 8 illustrates a flexible glass substrate and two flexible strips attached thereon as mechanical retainers, according to one or more embodiments.

In some embodiments, FIG. 8 illustrates glass substrate 100 and two flexible strips 800 attached thereon as two mechanical retainers 410. Strip 800 may extend along at least 80% of a dimension (e.g., length, width, or diagonal) of glass substrate 100, such as at least 85%, 90%, 95%, or in any range defined by any two of these values. In some embodiments, strip 800 may extend at least 95% of a dimension (e.g., length, width, or diagonal) of glass substrate 100, such as at least 96%, 97%, 98%, 99%, 100%, or in any range defined by any two of these values. In some embodiments, strip 800 may have a protruding portion (not shown), e.g., a plurality of guide pins or a minor strip, which matches with groove 220 and can be inserted into groove 220. Strips 800 are made of flexible material such that glass substrate 100 can maintain its flexibility in a non-cold forming state.

In some embodiments, FIG. 9A shows a perspective view of part of a frame 910 having a groove 912 therein. In some embodiments, FIG. 9B shows a perspective view of part of a frame 920 having two grooves 922, 924 therein. Any mechanical retainer 410 having a structure that matches with groove 912, 922, or 924 may be attached to frame 910 or 912.

In some embodiments, instead of being removably attached to frame 210, 910, 920 as described above, mechanical retainers 410 may be fixedly attached to a frame by means such as fasteners, adhesives, etc. In some embodiments, mechanical retainers 410 may be attached to a frame in a mixed manner. For example, mechanical retainers 410 may be first inserted into recesses of a frame; the attachment then may be enhanced by means such as fasteners, adhesives, etc.

In some embodiments, the flexible glass substrates or cold-formed glass substrates described herein may include various coatings, surface treatments and combinations thereof. In some embodiments, either one of or both the first major surface and the second major surface of the glass substrate may include a coating, a surface treatment or a combination thereof. Examples of such coatings include anti-reflective (AR), anti-glare (AG) and decorative and/or functional coatings. Examples of surface treatments include AG surfaces, a haptic surface that provides tactile feedback, recessed and/or raised portions providing indicia and the like.

Another aspect of this disclosure pertains to a process for forming the articles described herein. In one or more embodiments, the process includes attaching a plurality of separate mechanical retainers to a flexible glass substrate such that the glass substrate maintains its flexibility; and attaching at least one of the plurality of separate mechanical retainers to a frame (as described herein according to one or more embodiments) to cold-form the flexible glass substrate to a curved shape.

In one or more embodiments, the frame includes a recess and the process includes attaching at least one of the plurality of separate mechanical retainers to the frame by inserting at least one of the plurality of separate mechanical retainers into the recess.

In one or more embodiments, the frame comprises a groove, and each of the plurality of mechanical retainer comprises a guide block attached to one of two opposing major surfaces of the glass substrate and a guide pin protruding from the guide block such that attaching at least one of the plurality of separate mechanical retainers to the frame comprises aligning at least one guide pin to the groove, and sliding the at least one guide pin into the groove.

In one or more embodiments, the frame comprises a first groove and a second groove, and at least one of the plurality of separate mechanical retainers comprises a first guide block and a second guide block each attached to one of two opposing major surfaces of the glass substrate, and a guide rail extending between and through the first and second guide blocks, the guide rail protruding in two directions from each of the first and second guide blocks. In such embodiments, attaching at least one of the plurality of separate mechanical retainers to the frame comprises aligning a first end of the guide rail to the first groove and a second end of the guide rail to the second groove, and sliding the first and second ends of the guide rail into the first and second grooves, respectively.

In one or more embodiments, the process includes attaching at least one of the plurality of separate mechanical retainers to one of the opposing major surfaces of the glass substrate, before attaching the mechanical retainers to the frame. A t least one of the plurality of separate mechanical retainers may be removably attached to the frame.

In one or more embodiments, the prior to attaching at least one of the plurality of separate mechanical retainers to the frame, applying at least one coating or surface modification to at least one of the opposing major surfaces of the glass substrate. In some embodiments, prior to attaching at least one of the plurality of separate mechanical retainers to the frame, attaching a display to one of the opposing major surfaces of the glass substrate. In some embodiments, FIGS. 10A-10D depict an exemplary embodiment of a process of cold-forming curved glass substrate 100 with a coating thereon. In FIG. 10A, at least one coating or surface modification is applied to at least one of first and second major surfaces 102, 104 of glass substrate 100 in a planar shape before cold-forming. Compared with coating on a curved surface, a more uniform coating can be achieved on the planar surfaces. In some embodiments, the thickness of the at least one coating does not vary by more than 5% over the coated area, such as not more than 5%, 4%, 3%, 2%, or 1% over the coated area (measured by excluding edge effects). The at least one coating may be decorative or functional. In some embodiments, the at least one coating may be selected from the group consisting of an ink coating, an AR coating, an AG coating, an easy-to-clean coating, a conductive coating, and a haptic coating. Examples of conductive coatings include indium tin oxide or ITO coatings for use in touch-sensors, silver-nanowires, carbon nanotubes, graphene, and thin films that may include any one or more of nickel, titanium, chromium (i.e., Ni-, Ti-, and/or Cr-containing thin films). In some embodiments, an AG coating may be applied to improve optical characteristics of glass substrate 100. In some embodiments, an ink coating may be applied on second major surface 104 of glass substrate 100 by processes such as screen printing, pad printing, ink-jet printing, etc. Depending on the type of ink coating, a thermal or UV curing step may be performed. In some embodiments, an AR coating may be applied on first major surface 102 of glass substrate 100 by processes such as physical vapor deposition. Further, a surface treatment (typically formed by etching treatments) can be applied to one or both the first major surface or second major surface.

In the embodiment shown in FIG. 10B, the process includes attaching a display to second major surface 104 of glass substrate 100. In some embodiments, the area of second major surface 104 to which a display is attached is the area without ink coating. Optically clear adhesives such as pressure sensitive acrylics adhesives or silicone adhesives may be utilized to bond glass substrate 100 on top of a display, with thermal, moisture, or UV curing if needed. In some embodiments, the display is supported at the back side with a structural member.

In the embodiment shown in FIG. 10C, mechanical retainers 410 are attached to coated second major surface 104 of glass substrate 100 as described above in detail. Glass substrate 100 with coating(s) maintains its flexibility before cold-forming. In FIG. 10D, mechanical retainers 410 are attached to frame 210 as described above in detail. Mechanical retainers 410 attached to frame 210 define a cold-formed curved shape for glass substrate 100 with coating(s).

Figure 11:
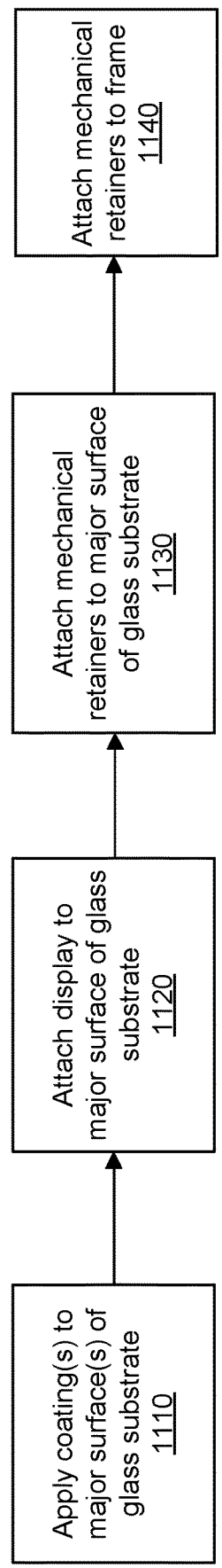
FIG. 11 shows a process flowchart corresponding to the process illustrated in FIGS. 10A-10D.

FIG. 11 shows a process flowchart corresponding to the process illustrated in FIGS. 10A-10D. The process can include further steps or may include less than all of the steps illustrated in further examples. As shown, the process starts from step 1110 of applying coating(s) to a flexible glass substrate 100 in a planar shape. One or more coatings may be applied to each or both of the two opposing major surfaces 102, 104 of glass substrate 100. The coatings include, but are not limited to, an ink coating, an anti-reflective coating, an anti-glare coating, an easy-to-clean coating, a conductive coating, and a haptic coating, as otherwise described herein. In addition, a surface treatment may be applied instead of or in addition to the coating. After coating, at step 1120, a display is attached to second major surface 104 of glass substrate 100. For example, optically clear adhesives, such as pressure sensitive acrylics adhesives or silicone adhesives, can be utilized to bond glass substrate 100 on top of a display. The optically clear adhesive may need to be cured (e.g., thermal, moisture or UV). In some embodiments, the display may be supported at the back side with a structural member.

Moving to step 1130, mechanical retainers 410 are attached second surface 104 of glass substrate 100. Mechanical retainers 410 may be fixedly attached, such as by permanent bonding, to second major surface 104 of glass substrate 100. In some embodiments, mechanical retainers 410 may be made of metal or plastic material. Before attaching mechanical retainers 410 to a frame 210 at step 1140, mechanical retainers 410 do not define a curved shape of flexible glass substrate 100. That is, attachment of mechanical retainers 410 does not change the original shape of flexible glass substrate 100, i.e., glass substrate 100 maintaining its flexibility.

At step 1140, mechanical retainers 410 are attached to frame 210 so as to define a cold-formed curved shape for flexible glass substrate 100. In some embodiments, mechanical retainers 410 are removably attached to frame 210, such as by inserting at least part of each mechanical retainer 410 into at least one recess in frame 210. In one example, each mechanical retainer 410 includes a guide block 412 attached to second major surface 102 of glass substrate 100 and a guide pin 414 protruding from guide block 412. In this example, at least one guide pin 414 is aligned to one of grooves 220 in frame 210 and is then slid into groove 220. In another example, each mechanical retainer 410 includes a first guide block 702 and a second guide block 704 each attached to second major surface 104 of glass substrate 100. Each mechanical retainer 410 also includes a guide rail 710 extending between and through first and second guide blocks 702, 704 and protruding in two directions from each of first and second guide blocks 702, 704. In this example, a first end 712 of guide rail 710 is aligned to a first groove 220 in frame 210 and a second end 714 of guide rail 710 is aligned to a second groove 220 in frame 210. First and second ends 712, 714 of guide rail 710 are then slid into first and second grooves 220, respectively.

Another aspect of this disclosure pertains to vehicle interior systems that incorporate various embodiments of the articles described herein. In one or more embodiments, the vehicle interior system includes a base having curved surface, a cold-formed glass substrate (or laminate including a cold-formed substrate, as described herein) having a curved shape; a plurality of separate mechanical retainers attached to the second major surface of the cold-formed glass substrate (or laminate including a cold-formed substrate, as described herein); and a frame disposed on the curved surface; wherein the mechanical retainers are attached to the frame to define a position for each of the plurality of mechanical retainers, such that the mechanical retainers define the curved shape. In one or more embodiments, the frame may be fixed to the curved surface by adhesive or mechanical fasteners. In one or more embodiments, the mechanical retainers may be directly attached to the base, which defines a position for each of the plurality of mechanical retainers.

In one or more embodiments, the cold-formed glass substrate (or laminate including a cold-formed substrate, as described herein) used in such vehicle interior systems comprises a glass surface, and wherein at all point of the glass surface have a Gaussian curvature (GC) that is equal to zero (GC=Kmax*Kmin, wherein Kmax and Kmin are principal curvatures defined as Kmax=1/R' and Kmin=1/R"), and wherein one of Kmax and Kmin is non-zero, R' is the maximum radius of curvature and R" is the minimum radius of curvature. In some embodiments, the glass substrate has a thickness of about 1.5 mm or less (or from about 0.4 mm to about 1.3 mm).

In one or more embodiments, a portion of the glass surface comprises a concave shape and R' of the convex shape is in a range from about 37.5 mm to about 500 mm. In some embodiments with a convex surface, the thickness of the substrate may be 0.4 mm and the R' may be in a range from about 100 mm to about 200 mm, from about 125 mm to about 200 mm, from about 150 mm to about 200 mm, form about 175 mm to about 200 mm, from about 100 mm to about 175 mm, from about 100 mm to about 150 mm, or from about 100 mm to about 125 mm. In some embodiments with a convex surface, the thickness of the substrate may be 0.55 mm and the R' may be in a range from about 150 mm to about 250 mm, from about 175 mm to about 250 mm, from about 200 mm to about 250 mm, form about 225 mm to about 250 mm, from about 150 mm to about 225 mm, from about 150 mm to about 200 mm, or from about 150 mm to about 175 mm. In some embodiments with a convex surface, the thickness of the substrate may be 0.7 mm and the R' may be in a range from about 200 mm to about 300 mm, from about 225 mm to about 300 mm, from about 250 mm to about 300 mm, form about 275 mm to about 300 mm, from about 200 mm to about 275 mm, from about 200 mm to about 250 mm, or from about 200 mm to about 225 mm. In some embodiments with a convex surface, the thickness of the substrate may be 1.1 mm and the R' may be in a range from about 350 mm to about 450 mm, from about 375 mm to about 450 mm, from about 300 mm to about 450 mm, form about 325 mm to about 450 mm, from about 350 mm to about 425 mm, from about 350 mm to about 400 mm, or from about 350 mm to about 375 mm. In some embodiments with a convex surface, the thickness of the substrate may be 1.3 mm and the R' may be in a range from about 450 mm to about 550 mm, from about 475 mm to about 550 mm, from about 400 mm to about 550 mm, form about 425 mm to about 550 mm, from about 450 mm to about 525 mm, from about 450 mm to about 500 mm, or from about 450 mm to about 475 mm.

In one or more embodiments, a portion of the glass surface comprises a concave shape and R' of the concave shape is in a range from about 15 mm to about 300 mm. In some embodiments with a concave surface, the thickness of the substrate may be 0.4 mm and the R' may be in a range from about 15 mm to about 100 mm, from about 30 mm to about 100 mm, from about 50 mm to about 100 mm, form about 75 mm to about 100 mm, from about 15 mm to about 75 mm, from about 15 mm to about 50 mm, or from about 15 mm to about 30 mm. In some embodiments with a concave surface, the thickness of the substrate may be 0.55 mm and the R' may be in a range from about 20 mm to about 150 mm, from about 40 mm to about 150 mm, from about 50 mm to about 150 mm, form about 75 mm to about 150 mm, from about 20 mm to about 125 mm, from about 20 mm to about 100 mm, or from about 20 mm to about 75 mm. In some embodiments with a concave surface, the thickness of the substrate may be 0.7 mm and the R' may be in a range from about 25 mm to about 175 mm, from about 50 mm to about 175 mm, from about 75 mm to about 175 mm, form about 100 mm to about 175 mm, from about 150 mm to about 175 mm, from about 25 mm to about 150 mm, from about 25 mm to about 125 mm, from about 25 mm to about 100 mm or from about 25 mm to about 75 mm. In some embodiments with a concave surface, the thickness of the substrate may be 1.1 mm and the R' may be in a range from about 40 mm to about 225 mm, from about 50 mm to about 225 mm, from about 75 mm to about 225 mm, form about 100 mm to about 225 mm, from about 150 mm to about 225 mm, from about 40 mm to about 200 mm, from about 40 mm to about 175 mm, from about 40 mm to about 150 mm or from about 40 mm to about 100 mm. In some embodiments with a concave surface, the thickness of the substrate may be 1.3 mm and the R' may be in a range from about 150 mm to about 250 mm, from about 175 mm to about 250 mm, from about 200 mm to about 250 mm, form about 225 mm to about 250 mm, from about 150 mm to about 225 mm, from about 150 mm to about 200 mm, or from about 150 mm to about 175 mm.

In one or more embodiments, the vehicle interior system includes a display. The display may be disposed between the base and the glass article. In some instances, the display is curved.

Another aspect of this disclosure pertains to a kit for assembling an article described herein in the interior of a vehicle or to provide the vehicle interior system described herein. In one or more embodiments, the kit includes a flexible glass substrate having a first major surface, and a second major surface opposing the first major surface; and a plurality of mechanical retainers attached to the second major surface of the flexible glass substrate such that the glass substrate maintains its flexibility; and a frame having a structure for engaging at least one of the plurality of mechanical retainers. In one or more embodiments, the frame includes one or more rigid members which are configured to attach to one another to surround, enclose, underlay, or support glass substrate in a cold-formed curved shape, when at least one of the plurality of mechanical retainers is engaged with the frame. In one or more embodiments, the frame includes two side members have edges in a curved shape. The frame may be made of metal or plastic material. In one or more embodiments, the structure of the frame for engaging at least one of the plurality of mechanical retainers includes one or more a grooves or one or more recesses. In one or more embodiments, the flexible glass substrate is present in a substantially flat or planar shape, and the plurality of mechanical retainers do not, on their own, cold-form the flexible glass substrate into a curved shape. In one or more embodiments, none of the plurality of mechanical retainers are engaged with or attached to the frame. In one or more embodiments, when one or more or two or more of the plurality of mechanical retainers are engaged with or attached to the frame, the flexible glass substrate is cold-formed to a curved shape. In one or more embodiments, when one or more or two or more of the plurality of mechanical retainers are engaged with or attached to the frame, the cold-formed glass substrate has a bending force that applies at least a portion of the force required to retain the engaged or attached mechanical retainers to the frame (i.e., in the groove or recess, as applicable). In one or more embodiments, the kit may include an optional adhesive to augment the engagement or attachment between the one or more, or two or more of the plurality of mechanical retainers and the frame.

In one or more embodiments, the kit includes a display. In one or more embodiments, the display may be attached to the second major surface, as described herein. In such embodiments, the display is not attached to the frame. In one or more embodiments, the may be flexible, and the flexible glass and the flexible display maintain their flexibility after attachment to one another (i.e., the flexible glass and the flexible glass are present in a substantially flat or planar shape, and the plurality of mechanical retainers do not, on their own, cold-form the flexible glass substrate or the display into a curved shape. In one or more such embodiments, none of the plurality of mechanical retainers are engaged with or attached to the frame. In one or more embodiments, when at least one of the plurality of mechanical retainers is engaged with the frame, the flexible glass substrate is cold-formed to a curved shape.

In one or more embodiments, the display is curved. In one or more embodiments, the curved display is not attached to the flexible glass substrate or the frame. In such embodiments, the curved display may be attached after at least one plurality of mechanical retainers is attached to the frame, and the flexible glass substrate is cold-formed into a curved shape. In one or more embodiments, the cold-formed glass substrate has a radius of curvature that is within 10% (i.e., about 10% or less, about 9% or less, about 8% or less, about 7% or less, about 6% or less, about 5% or less, about 4% or less, about 3% or less or about 2% or less) of the radius of curvature of the curved display.

In one or more embodiments, the frame is attached to the display. Optionally, the display is curved after attachment to the frame. In one or more such embodiments of the kit, when at least one of the plurality of mechanical retainers is engaged with the frame, an air gap is disposed between the display and the second major surface. In one or more such embodiments, when at least one of the plurality of mechanical retainers is engaged with the frame, the display is in contact with the second major surface.

In one or more embodiments, the kit includes a flexible glass substrate having a first major surface, and a second major surface opposing the first major surface; and a plurality of mechanical retainers attached to the second major surface of the flexible glass substrate; a display; and a frame having a structure for engaging at least one of the plurality of mechanical retainers, wherein at least one of the plurality of mechanical retainers is engaged with the frame, and the flexible glass substrate is a cold-formed flexible glass substrate with a curved shape. In one or more embodiments, the structure includes a groove or a recess that engages at least one of the plurality of mechanical retainers. In one or more embodiments such, the flexible glass substrate is cold-formed into a curved shape through engagement of the at least one of the plurality of mechanical retainers and the frame. The cold-formed glass substrate has a bending force that applies at least a portion of the force required to retain the engaged or attached mechanical retainers to the frame (i.e., in the groove or recess, as applicable). In one or more embodiments, the kit may include an optional adhesive to augment the engagement or attachment between the one or more, or two or more of the plurality of mechanical retainers and the frame. In one or more embodiments of this kit, the display is not attached to the glass substrate or frame. In one or more embodiments, the display is flexible (and may be present in a substantially flat or planar state). In one or more embodiments, the display is curved. In one or more embodiments, when the display is attached to the second surface, the display has the curved shape of the cold-formed flexible glass substrate. In one or more embodiments, the cold-formed glass substrate has a radius of curvature that is within 10% (i.e., about 10% or less, about 9% or less, about 8% or less, about 7% or less, about 6% or less, about 5% or less, about 4% or less, about 3% or less or about 2% or less) of the radius of curvature of the curved display.

Aspect (1) of this disclosure pertains to an article comprising: a cold-formed glass substrate in a curved shape, the cold-formed glass substrate having a first major surface, and a second major surface opposing the first major surface; a plurality of separate mechanical retainers attached to the second major surface of the cold-formed glass substrate; and a frame; wherein the mechanical retainers are attached to the frame, and wherein one or both the mechanical retainers and the frame maintain the curved shape of the cold-formed glass substrate.

Aspect (2) of this disclosure pertains to the article of Aspect (1), wherein the cold-formed glass substrate comprises a minor surface that is orthogonal to the first major surface and the second major surface, wherein the minor surface has a minor surface area and at least a portion of the minor surface area is exposed.

Aspect (3) of this disclosure pertains to the article of Aspect (2), wherein at least 80% of the minor surface area is exposed.

Aspect (4) of this disclosure pertains to the article of Aspect (3), wherein all of the minor surface area of the cold-formed glass substrate is exposed.

Aspect (5) of this disclosure pertains to the article of any one of Aspects (1) through (4), wherein the entirety of the first major surface is exposed relative to the frame.

Aspect (6) of this disclosure pertains to the article of any one of Aspects (1) through (5), wherein the mechanical retainers are fixedly attached to the second major surface of the cold-formed glass substrate.

Aspect (7) of this disclosure pertains to the article of any one of Aspects (1) through (6), wherein the mechanical retainers are removably attached to the frame.

Aspect (8) of this disclosure pertains to the article of Aspect (7), wherein the frame comprises at least one recess and the mechanical retainers are inserted into the at least one recess.

Aspect (9) of this disclosure pertains to the article of any one of Aspects (1) through (8), wherein the mechanical retainers, in the absence of the frame, do not define the curved shape of the cold-formed glass substrate.

Aspect (10) of this disclosure pertains to the article of any one of Aspects (1) through (9), wherein the frame comprises at least one groove, wherein at least one of the plurality of mechanical retainers comprises a guide block attached to the second major surface of the cold-formed glass substrate, and a guide pin protruding from the guide block; and wherein at least part of the guide pin is inserted into the at least one groove.

Aspect (11) of this disclosure pertains to the article of any one of Aspects (1) through (10), wherein the frame comprises a first groove and a second groove, wherein at least one of the plurality of mechanical retainers comprises a first guide block and a second guide block each attached to the second major surface of the cold-formed glass substrate, and a guide rail extending between and through the first and second guide blocks, the guide rail protruding in two directions from each of the first and second guide blocks, wherein a first end of the guide rail is inserted into the first groove; and wherein a second end of the guide rail is inserted into the second groove.

Aspect (12) of this disclosure pertains to the article of Aspect (10) or Aspect (11), wherein the plurality of guide blocks are collectively attached to less than 50% of the area of the second major surface of the cold-formed glass substrate.

Aspect (13) of this disclosure pertains to the article of any one of Aspects (1) through (12), wherein the frame comprises at least one groove, and wherein at least one of the plurality of mechanical retainers comprises a flexible strip that extends along at least 80% of a dimension of the cold-formed glass substrate.

Aspect (14) of this disclosure pertains to the article of any one of Aspects (1) through (13), wherein at least one of the plurality of mechanical retainers are made of metal or plastic material.

Aspect (15) of this disclosure pertains to the article of any one of Aspects (1) through (14), wherein at least one of the plurality of mechanical retainers is attached to the second major surface using an adhesive.

Aspect (16) of this disclosure pertains to the article of any one of Aspects (1) through (15), further comprising at least one coating or a surface treatment disposed on at least one of the first and the second major surfaces of the cold-formed glass substrate.

Aspect (17) of this disclosure pertains to the article of Aspect (16), wherein the at least one coating is selected from the group consisting of an ink coating, an anti-reflective coating, an anti-glare coating, an easy-to-clean coating, a conductive coating, and a haptic coating, and the at least one surface treatment is selected from the group consisting of an antiglare surface, a haptic surface and raised and recessed indicia.

Aspect (18) of this disclosure pertains to the article of Aspect (16), wherein the thickness of the at least one coating does not vary by more than 5% over the coated area.

Aspect (19) of this disclosure pertains to the article of any one of Aspects (1) through (18), further comprising a display attached to the second major surface of the cold-formed glass substrate.

Aspect (20) of this disclosure pertains to the article of any one of Aspects (1) through (19), wherein the frame is not visible through the cold-formed glass substrate.

Aspect (21) of this disclosure pertains to the article of any one of Aspects (1) through (20), wherein the cold-formed glass substrate is a strengthened glass substrate.

Aspect (22) of this disclosure pertains to the article of any one of Aspects (1) through (21), wherein each of the first and second major surfaces have a surface stress, and the surface stresses differ from one another.

Aspect (23) of this disclosure pertains to an article comprising: a flexible glass substrate having a first major surface, and a second major surface opposing the first major surface; and a plurality of separate mechanical retainers attached to the second major surface of the flexible glass substrate such that the glass substrate maintains its flexibility.

Aspect (24) of this disclosure pertains to the article of Aspect (23), further comprising a display attached to the second major surface of the flexible glass substrate.

Aspect (25) of this disclosure pertains to the article of Aspect (23), wherein the display is flexible maintains its flexibility when attached to the second major surface.

Aspect (26) of this disclosure pertains to the article of any one of Aspects (23) through (25), further comprising a frame, wherein at least a portion of the plurality of separate mechanical retainers are attached to the frame to cold-form the flexible glass substrate to a curved shape.

Aspect (27) of this disclosure pertains to a process comprising attaching a plurality of separate mechanical retainers to a flexible glass substrate such that the glass substrate maintains its flexibility; and attaching at least one of the plurality of separate mechanical retainers to a frame to cold-form the flexible glass substrate to a curved shape.

Aspect (28) of this disclosure pertains to the process of Aspect (27), further comprising: prior to attaching at least one of the plurality of separate mechanical retainers to the frame, applying at least one coating to at least one of the opposing major surfaces of the glass substrate.

Aspect (29) of this disclosure pertains to the process of Aspect (27) or Aspect (28), further comprising: prior to attaching at least one of the plurality of separate mechanical retainers to the frame, attaching a display to one of the opposing major surfaces of the glass substrate.

Aspect (30) of this disclosure pertains to the process of any one of Aspects (27) through Aspect (29), further comprising attaching at least one of the plurality of separate mechanical retainers to one of the opposing major surfaces of the glass substrate, before attaching the mechanical retainers to the frame.

Aspect (31) of this disclosure pertains to the process of any one of Aspects (27) through (30), wherein at least one of the plurality of separate mechanical retainers is removably attached to the frame.

Aspect (32) of this disclosure pertains to the process of any one of Aspects (27) through (31), wherein the frame comprises a recess; and wherein attaching at least one of the plurality of separate mechanical retainers to the frame comprises inserting at least one of the plurality of separate mechanical retainers into the recess.

Aspect (33) of this disclosure pertains to the process of any one of Aspects (27) through (32), wherein the frame comprises a groove; wherein each of the plurality of mechanical retainer comprises a guide block attached to one of two opposing major surfaces of the glass substrate and a guide pin protruding from the guide block; and wherein attaching at least one of the plurality of separate mechanical retainers to the frame comprises: aligning at least one guide pin to the groove, and sliding the at least one guide pin into the groove.

Aspect (34) of this disclosure pertains to the process of any one of Aspects (27) through (33), wherein the frame comprises a first groove and a second groove; wherein at least one of the plurality of separate mechanical retainers comprises a first guide block and a second guide block each attached to one of two opposing major surfaces of the glass substrate, and a guide rail extending between and through the first and second guide blocks, the guide rail protruding in two directions from each of the first and second guide blocks, and wherein attaching at least one of the plurality of separate mechanical retainers to the frame comprises: aligning a first end of the guide rail to the first groove and a second end of the guide rail to the second groove, and sliding the first and second ends of the guide rail into the first and second grooves, respectively.

Aspect (35) of this disclosure pertains to a kit comprising: a flexible glass substrate having a first major surface, and a second major surface opposing the first major surface; a plurality of mechanical retainers attached to the second major surface of the flexible glass substrate such that the glass substrate maintains its flexibility; a frame comprising a groove or a recess for engaging at least one of the plurality of mechanical retainers.

Aspect (36) of this disclosure pertains to the kit of Aspect (35), further comprising a display.

Aspect (37) of this disclosure pertains to the kit of Aspect (36), wherein the display is attached to the second major surface.

Aspect (38) of this disclosure pertains to the kit of Aspect (37), wherein the display is flexible, and the flexible glass and the flexible display maintain their flexibility after attachment.

Aspect (39) of this disclosure pertains to the kit of Aspect (36) wherein the display is curved.

Aspect (40) of this disclosure pertains to the kit of any one of Aspects (36) through (39), wherein the frame is attached to the display.

Aspect (41) of this disclosure pertains to the kit of Aspect (40), wherein, when at least one of the plurality of mechanical retainers is engaged with the frame, an air gap is disposed between the display and the second major surface.

Aspect (42) of this disclosure pertains to the kit of any one of Aspects (35) through (41), wherein, when at least one of the plurality of mechanical retainers is engaged with the frame, the flexible glass substrate is cold-formed to a curved shape.

Aspect (43) of this disclosure pertains to the kit of Aspect (35), further comprising a display, wherein at least one of the plurality of mechanical retainers is engaged with the frame, and the flexible glass substrate is a cold-formed flexible glass substrate with a curved shape.

Aspect (44) of this disclosure pertains to the kit of Aspect (43), wherein the display is flexible.

Aspect (45) of this disclosure pertains to the kit of any one of Aspects (43) through (44), wherein the display is curved.

Aspect (46) of this disclosure pertains to the kit of any one of Aspects (43) through (45), wherein, when the display is attached to the second surface, the display has the curved shape of the cold-formed flexible glass substrate.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. An article comprising:
   a frame;
   a glass substrate comprising a first major surface and a second major surface opposite the first major surface; and
   one or more mechanical retainers bonded to the second major surface in such a way so as to not alter an original shape of the glass substrate, wherein:
      a mechanical retainer of the one or more mechanical retainers is engaged with the frame so as to cold-form the glass substrate into a curved shape that is different from the original shape such that the cold-formed glass substrate applies a bending force to the frame, wherein the cold-formed glass substrate comprises minor surfaces extending between the first major surface and the second major surface, wherein the minor surfaces are exposed and not in contact with the mechanical retainer.

2. The article of claim 1, wherein the mechanical retainer comprises a flexible strip that extends along at least 95% of a dimension of the glass substrate.

3. The article of claim 2, wherein the flexible strip extends along 100% of the dimension of the glass substrate.

4. The article of claim 1, wherein the frame comprises a structure for engaging the mechanical retainer without the use of an optional adhesive.

5. The article of claim 1, wherein the frame comprises one or more edges having the curved shape.

6. The article of claim 5, wherein the mechanical retainer is formed by injection molding.

7. The article of claim 1, wherein the original shape of the glass substrate comprises a planar shape.

8. The article of claim 1, wherein frame is directly attached to a curved surface of a base of a vehicle interior system.

9. The article of claim 1, wherein the cold-formed glass substrate consists of a single sheet of chemically strengthened glass.

10. The article of claim 1, further comprising a decorative ink coating on the second major surface.

11. The article of claim 1, wherein one of the first major surface and the second major surface comprises a radius of curvature that is greater than or equal to 37.5 mm and less than or equal to 500 mm.

12. The article of claim 1, wherein the cold-formed glass substrate comprises a thickness that is greater than or equal to 0.4 mm and less than or equal to 1.5 mm.

13. The article of claim 1, wherein the frame comprises one or more rigid members configured to underlay the glass substrate in the curved shape.

14. An article comprising:
   a base of a vehicle interior system, the base comprising a curved surface;
   a glass substrate comprising a first major surface and a second major surface opposite the first major surface; and
   one or more mechanical retainers fixedly attached to the second major surface, wherein the one or more mechanical retainers are less rigid than the glass substrate such that the glass substrate retains flexibility to return to an original shape after the one or more mechanical retainers are fixedly attached to the second major surface, wherein:
      a mechanical retainer of the one or more mechanical retainers is engaged with the base so as to cold-form the glass substrate into a curved shape that is different from the original shape such that the cold-formed glass substrate applies a bending force to the base, and
      the mechanical retainer comprises a flexible strip that extends 100% of a dimension of the glass substrate.

15. The article of claim 14, further comprising a decorative ink coating on the second major surface.

16. The article of claim 14, wherein the cold-formed glass substrate consists of a single sheet of chemically strengthened glass.

17. The article of claim 14, wherein one of the first major surface and the second major surface comprises a radius of curvature that is greater than or equal to 37.5 mm and less than or equal to 500 mm.

18. The article of claim 14, wherein the base defines a position for the mechanical retainer to define the curved shape.

19. The article of claim 14, wherein the original shape of the glass substrate comprises a planar shape.

* * * * *